United States Patent
Whitaker et al.

(10) Patent No.: US 9,959,560 B1
(45) Date of Patent: May 1, 2018

(54) SYSTEM AND METHOD FOR CUSTOMIZING A USER EXPERIENCE BASED ON AUTOMATICALLY WEIGHTED CRITERIA

(71) Applicant: Intuit Inc., Mountain View, CA (US)

(72) Inventors: Nathan Whitaker, San Diego, CA (US); Zach Winkler, San Diego, CA (US); Christine Anne Byrne, Monte Sereno, CA (US)

(73) Assignee: Intuit Inc., Mountain View, CA (US)

( * ) Notice: Subject to any disclaimer, the term of this patent is extended or adjusted under 35 U.S.C. 154(b) by 840 days.

(21) Appl. No.: 14/468,624

(22) Filed: Aug. 26, 2014

(51) Int. Cl.
*G06Q 30/00* (2012.01)
*G06Q 30/06* (2012.01)

(52) U.S. Cl.
CPC ..... *G06Q 30/0625* (2013.01); *G06Q 30/0631* (2013.01)

(58) Field of Classification Search
CPC ......... G06F 17/30867; G06F 17/30395; G06F 17/30424; G06F 17/3053; G06Q 30/0201; G06Q 30/0282; G06Q 30/06–30/0645; G06Q 30/08; G06Q 50/01
See application file for complete search history.

(56) References Cited

U.S. PATENT DOCUMENTS

| | | | |
|---|---|---|---|
| 5,884,283 A | 3/1999 | Manos | |
| 6,021,397 A | 2/2000 | Jones et al. | |
| 6,401,080 B1 * | 6/2002 | Bigus | G06Q 20/3821 705/35 |
| 7,010,507 B1 | 3/2006 | Anderson et al. | |
| 7,181,438 B1 * | 2/2007 | Szabo | G06F 17/30522 |
| 7,539,635 B1 | 5/2009 | Peak et al. | |
| 7,603,301 B1 | 10/2009 | Regan | |
| 7,610,226 B1 | 10/2009 | Miller | |
| 7,636,742 B1 | 12/2009 | Olavarrieta et al. | |
| 7,680,756 B2 | 3/2010 | Quinn et al. | |
| 7,693,769 B1 | 4/2010 | Burlison et al. | |

(Continued)

FOREIGN PATENT DOCUMENTS

| | | |
|---|---|---|
| JP | 2002-099613 | 4/2002 |
| KR | 10-2009-0089225 | 8/2009 |

OTHER PUBLICATIONS

Zhang, "Enabling Personalization Recommendation With WeightedFP for Text Information Retrieval Based on User-Focus," Proceedings of the International Conference on Information Technology: Coding and Computing (ITCC'04), 5pp.*

(Continued)

*Primary Examiner* — Adam Levine
(74) *Attorney, Agent, or Firm* — Hawley Troxell Ennis & Hawley LLP; Philip McKay

(57) ABSTRACT

Transaction data of a first party and transaction data of a population are both analyzed to determine weighting and normalizing factors, which when applied to data operate to prioritize and personalize the data. The prioritization of the data is based on the analysis and results in use of the data in accordance with user preferences as evidenced in prior activities of the first party represented by the transaction data. In a navigation system, applying data prioritizations speeds performance of the system and eliminates duplicate or follow-on searches, and allows efficient selection of potential routes and destinations.

27 Claims, 4 Drawing Sheets

(56) References Cited

U.S. PATENT DOCUMENTS

| | | |
|---|---|---|
| 7,747,484 B2 | 6/2010 | Stanley et al. |
| 7,778,895 B1 | 8/2010 | Baxter et al. |
| 7,818,222 B2 | 10/2010 | Allanson et al. |
| 7,860,763 B1 | 12/2010 | Quinn et al. |
| 7,904,356 B1 | 3/2011 | Cobarrubia |
| 7,930,226 B1 | 4/2011 | Quinn et al. |
| 8,001,006 B1 | 8/2011 | Yu et al. |
| 8,019,664 B1 | 9/2011 | Tifford et al. |
| 8,024,660 B1 | 9/2011 | Quinn et al. |
| 8,190,499 B1 | 5/2012 | McVickar |
| 8,346,635 B1 | 1/2013 | Olim |
| 8,407,113 B1 | 3/2013 | Eftekhari et al. |
| 8,417,596 B1 | 4/2013 | Dunbar et al. |
| 8,417,715 B1 | 4/2013 | Bruckhaus et al. |
| 8,429,184 B2* | 4/2013 | Ismalon ............. G06F 17/3064 707/713 |
| 8,447,667 B1 | 5/2013 | Dinamani et al. |
| 8,635,127 B1 | 1/2014 | Shaw |
| 8,656,273 B1 | 2/2014 | Tifford et al. |
| 8,719,120 B1 | 5/2014 | McVickar et al. |
| 8,812,380 B2 | 8/2014 | Murray et al. |
| 8,874,731 B1 | 10/2014 | Puppin |
| 8,903,810 B2* | 12/2014 | Ismalon ............. G06F 17/3064 382/159 |
| 9,098,586 B1 | 8/2015 | Latif et al. |
| 9,117,247 B2 | 8/2015 | Lieberman et al. |
| 9,153,141 B1 | 10/2015 | Kane et al. |
| 9,286,282 B2 | 3/2016 | Ling et al. |
| 9,390,402 B1 | 7/2016 | Kane et al. |
| 2002/0111888 A1 | 8/2002 | Stanley et al. |
| 2005/0054381 A1 | 3/2005 | Lee et al. |
| 2005/0144072 A1 | 6/2005 | Perkowski et al. |
| 2005/0160103 A1 | 7/2005 | Raffo |
| 2005/0210024 A1 | 9/2005 | Hurst-Hiller et al. |
| 2006/0122918 A1 | 6/2006 | Graboske et al. |
| 2006/0178961 A1 | 8/2006 | Stanley et al. |
| 2006/0184410 A1 | 8/2006 | Ramamurthy et al. |
| 2007/0033116 A1 | 2/2007 | Murray |
| 2008/0027979 A1 | 1/2008 | Chandrasekar et al. |
| 2008/0059900 A1 | 3/2008 | Murray et al. |
| 2008/0104045 A1 | 5/2008 | Cohen et al. |
| 2008/0189197 A1 | 8/2008 | Allanson et al. |
| 2008/0201206 A1 | 8/2008 | Pokorney et al. |
| 2008/0263643 A1 | 10/2008 | Jaiswal et al. |
| 2009/0076335 A1 | 3/2009 | Schwarzberg et al. |
| 2009/0099959 A1 | 4/2009 | Liao et al. |
| 2009/0307159 A1 | 12/2009 | Pinckney et al. |
| 2010/0017348 A1 | 1/2010 | Pinckney et al. |
| 2010/0023934 A1 | 1/2010 | Sheehan et al. |
| 2010/0262495 A1 | 10/2010 | Dumon et al. |
| 2011/0078066 A1 | 3/2011 | Sherman et al. |
| 2011/0119264 A1 | 5/2011 | Hu et al. |
| 2011/0137776 A1 | 6/2011 | Goad et al. |
| 2011/0173116 A1 | 7/2011 | Yan et al. |
| 2011/0264569 A1 | 10/2011 | Houseworth et al. |
| 2012/0030159 A1 | 2/2012 | Pilaszy et al. |
| 2012/0030767 A1 | 2/2012 | Rippert et al. |
| 2012/0084185 A1 | 4/2012 | Ciaramitaro et al. |
| 2012/0109792 A1 | 5/2012 | Eftekhari et al. |
| 2012/0136764 A1 | 5/2012 | Miller et al. |
| 2012/0278179 A1 | 11/2012 | Ray et al. |
| 2012/0324393 A1 | 12/2012 | Mbenkum et al. |
| 2013/0091050 A1 | 4/2013 | Merrill et al. |
| 2013/0198047 A1 | 8/2013 | Houseworth et al. |
| 2013/0254151 A1 | 9/2013 | Mohagheghi et al. |
| 2013/0282733 A1 | 10/2013 | Tawakol et al. |
| 2014/0101571 A1 | 4/2014 | Lewis |
| 2014/0156566 A1 | 6/2014 | Kabiljo et al. |
| 2014/0180883 A1 | 6/2014 | Regan |
| 2014/0201045 A1 | 7/2014 | Pai et al. |
| 2014/0222702 A1 | 8/2014 | Jennings |
| 2014/0279190 A1* | 9/2014 | Severinghaus .... G06Q 30/0631 705/26.7 |
| 2014/0314225 A1 | 10/2014 | Riahi et al. |
| 2014/0324648 A1 | 10/2014 | Mori et al. |
| 2014/0337189 A1 | 11/2014 | Barsade et al. |
| 2015/0007065 A1 | 1/2015 | Krishnamoorthy et al. |
| 2015/0026146 A1 | 1/2015 | Mance |
| 2015/0149877 A1 | 5/2015 | Ling et al. |
| 2015/0178371 A1 | 6/2015 | Seth et al. |
| 2015/0332167 A1 | 11/2015 | Kaushal et al. |
| 2015/0363875 A1* | 12/2015 | Guerry ................ G06Q 40/025 705/38 |
| 2016/0034853 A1 | 2/2016 | Wang et al. |
| 2016/0098804 A1 | 4/2016 | Mascaro et al. |
| 2016/0125552 A1 | 5/2016 | Pathak et al. |
| 2016/0148322 A1 | 5/2016 | Mascaro et al. |
| 2016/0180470 A1 | 6/2016 | Mascaro et al. |
| 2016/0246762 A1 | 8/2016 | Eaton |
| 2016/0247239 A1 | 8/2016 | Houseworth et al. |
| 2017/0132314 A1 | 5/2017 | Liu et al. |

OTHER PUBLICATIONS

Forsati, "Web Page Personalization Based on Weighted Association Rules," 2009 International Conference on Electronic Computer Technology, pp. 130-135.*

Anders, B. Susan; "Website of the Month: MSN Money Tax Center," Apr. 2013, The CPA Journal, pp. 72-73.

U.S. Appl. No. 60/608,035, filed Sep. 7, 2004, Quinn et al.

* cited by examiner

SYSTEM AND METHOD FOR CUSTOMIZING A USER EXPERIENCE BASED ON AUTOMATICALLY WEIGHTED CRITERIA

BACKGROUND

Throughout any typical day, a given person often encounters many situations where a decision made by one or more different people affects them in some way.

For example, a merchant makes decisions such as where to locate their store, one or more products to carry, and one or more products to advertise, in order to try to encourage consumers to purchase items. If a consumer feels sufficiently motivated by one or more of the decisions made by the merchant, the consumer may visit the merchant to view and/or purchase one or more items. However, the consumer is not tied to the merchant in any way, and, although the merchant and the consumer may share commonalities, those commonalities rarely play any role in getting the consumer and the merchant together, and achieving a successful purchase transaction.

In a second example, a search, for example, in a Global Positioning Satellite (GPS) system, or associated with a web browser may use information provided by a user in order to search a database to determine one or more database items that are relevant to the user-provided information, later either using one or more database items for other purposes, or providing a list of one or more of the database items to the user. As in the case of the merchant trying to sell merchandise, the situation involving the search using a GPS system, a web browser, or other search tools is accomplished with little or no association between the search results and the person initiating the search. Thus, the search results are often ranked according to how others used the search results, with little or no consideration given regarding about how the particular searcher goes about their life and any preferences the particular searcher may have beyond the information provided as search criteria.

In the GPS case, a search may be made by a consumer, for example, who wishes to find a local meat market. The search may use a local and/or a remote database to find meat markets in the same city, and may display the local meat markets according to the given meat market's proximity to the consumer's present location. Thus, there is little or no consideration given regarding how the particular searcher goes about their life and any preferences the particular searcher may have beyond the information provided as search criteria.

Therefore, it would be beneficial to have a system and method for customizing a user experience based on automatically weighted criteria, resulting in optimized searching and improved computing system functionality.

SUMMARY

In one embodiment, a system for customizing a user experience based on automatically weighted criteria couples the analysis of transaction data of a party to the presentation and use of search results associated with the party.

In one embodiment, a system for customizing a user experience based on automatically weighted criteria includes a process for customizing a user experience based on automatically weighted criteria which includes receiving a search request from an originating computing system. In typical operation, the originating computing system receives user input from a party in control of, or otherwise operating the originating computing system. In one embodiment, the search request includes search criteria at least partly defining a search the party wishes to perform. Search functionality receiving the search request may be part of a mapping system, as one example, such as a mapping system having a location determining module, where the request involves the party indicating a desire for a particular kind of food, or a particular category of restaurant, or any other kind of search request, with the mapping system optionally using a location of the originating computing system as data affecting either the search itself, a presentation of search results, or both. Correspondingly, in one embodiment, various geographic locations associated with search results affect how search results are used and/or presented.

In one embodiment, a process for customizing a user experience based on automatically weighted criteria includes determining two or more search request results meeting the search criteria, each of the two or more search request results having results characteristics. In one embodiment, the results characteristics relate to one or more of the search results, and define one or more attributes associated with the search result. In one embodiment, a results characteristic associated with a search result is derived from data associated with the search result.

For example, results characteristics for a search result involving a restaurant include, but are not limited to, one or more of a typical out the door total price for groups of varying sizes, a price or price range for one or more menu items, location, distance from a given location, typical attire worn by customers of the restaurant, one or more items available on a menu of the restaurant, category, type or style of food served, whether reservations are accepted and/or required, one or more ratings of the restaurant by third parties, one or more ratings of the restaurant by specific members or categories of members of a population or users, and any other results characteristic.

In one embodiment, a process for customizing a user experience based on automatically weighted criteria includes receiving first party transaction data of the first party, the first party transaction data including individual first party transactions having first party transaction characteristics associated with the first party.

In one embodiment, the first party transaction data includes data evidencing one or more financial transactions of the first party, such as financial transaction data received from a bank or other financial institution, or financial transaction data provided by the first party. In one embodiment, other transactions are included in the first party transaction data, such as rating transaction data including one or more ratings of one or more entities, such as one or more restaurants, by the first party, historical location information reflecting one or more locations traveled by the first party, historical location information reflecting recurring travel routes, origin locations and/or destination locations of the first party, travel logs reflecting one or more locations the first party stayed overnight, travel logs reflecting recurring overnight stays over a period of time, and any other transaction information reflecting the first party performing one or more activities.

In one embodiment, the first party transaction characteristics include attributes or other details associated with the first party transaction data. In one embodiment, one or more of the first party transaction characteristics are directly associated with one or more first party transactions of the first party transaction data, such as, for example, a restaurant name being a payee listed in a first party financial transaction of the first party transaction data. In one embodiment, one or more of the first party transaction characteristics are indirectly associated with, or derived from, one or more first party transactions of the first party transaction data. For example, in a first party financial transaction listing a restaurant as a payee, where the address of the restaurant isn't data needed for the first party financial transaction to be processed, the address of the restaurant is a first party transaction characteristic derived from the payee name, and is determined using the payee name as a search parameter in one or more external databases. Further, by using the address of the payee and a location of the first party, one or more of a driving distance, driving time, a likely or actual route, and other first party transaction characteristics are derived.

In one embodiment, a process for customizing a user experience based on automatically weighted criteria includes receiving population transaction data for a population of parties other than the first party, the population transaction data including individual population transactions having population transaction characteristics associated with parties of the population.

In one embodiment, the population transaction data includes one or more of population financial transaction data of the parties of the population, such as population financial transaction data received from a bank or other financial institution, or population financial transaction data provided by one or more of the parties. In one embodiment, other transactions are included in the first party transaction data, such as rating transaction data including one or more ratings of one or more entities, such as one or more restaurants, by one or more parties of the population, historical location information reflecting one or more locations traveled by one or more parties of the population, historical location information reflecting recurring travel routes traveled by one or more parties of the population, origin locations and/or destination locations of one or more parties of the population, travel logs reflecting one or more locations where one or more parties of the population stayed overnight, travel logs reflecting recurring overnight stays over a period of time, and any other population transaction information reflecting one or more parties of the population performing one or more activities.

In one embodiment, the population transaction characteristics include attributes or other details associated with the population transaction data. In one embodiment, one or more of the population transaction characteristics are directly associated with one or more population transactions of the population transaction data, such as, for example, a restaurant name being a payee listed in a population financial transaction of the population transaction data. In one embodiment, one or more of the population transaction characteristics are indirectly associated with or derived from one or more population transactions of the population transaction data. For example, in one embodiment, in a population financial transaction listing a restaurant payee, where the address of the restaurant isn't data needed for the population financial transaction to be processed, the address of the restaurant is a population transaction characteristic derived from the payee name, and is determined using the payee name as a search parameter in one or more external databases. Further, by using the address of the payee and a location of the party of the population to which the population transaction applies, one or more of a driving distance, driving time, route, and other population transaction characteristics are derived.

In one embodiment, a process for customizing a user experience based on automatically weighted criteria includes determining, using the first party transaction data, a party weighting value for each of the first party transaction characteristics of the first party transaction data that match at least one of the results characteristics associated with one or more of the search results.

In one embodiment, a party weighting value is a value associated with a first party transaction characteristic which indicates a level of importance placed on the particular first party transaction characteristic by the first party, as indicated by an analysis of first party transaction data associated with activities the first party undertakes. In one embodiment, the party weighting value associated with a particular first party transaction characteristic increases in importance as the variability of individual values of the first party transaction characteristics decreases.

In one embodiment, determining a party weighting value includes determining one or more first party transaction characteristics of one or more transactions of the first party transaction data. Using first party financial transactions as an example, first party financial transactions listing restaurants as payees have a distance associated with them, such as the travel distance between a home location of the first party and the restaurants of the various transactions. In this example, determining one or more first party transaction characteristics of one or more transactions of the first party transaction data includes at least determining a distance associated with each of the first party financial transactions listing restaurants. Further, in a system where categorization of restaurant is considered, first party transaction characteristics are grouped according to the category of restaurant, and each group of transaction characteristics is analyzed separately, and party weighting values for each group individually determined.

In one embodiment, determining a party weighting value further includes determining one or more population transaction characteristics of one or more transactions of the population transaction data. Similar to party transaction characteristics, and using population financial transactions as an example, population financial transactions listing restaurants as payees have a distance associated with them, such as the travel distance between a home location of a population party of the transaction and the restaurants of the various transactions. In this example, determining one or more population transaction characteristics of one or more transactions of the population transaction data includes at least determining a distance associated with each of the population financial transactions listing restaurants. Further, in a system where categorization of restaurant is considered, population transaction characteristics are grouped according to the category of restaurant, and each group of transaction characteristics is analyzed separately, and party weighting values for each group individually determined.

In one embodiment, determining a party weighting value further includes performing a series of operations for each first party transaction characteristic that is equivalent to a population transaction characteristic, and which is also equivalent to a results characteristic.

In one embodiment, the series of operations includes determining, using first party transactions having the first party transaction characteristic, how much variability is represented by the first party transaction characteristic. In one embodiment, the amount of variability is determined by determining a first party standard deviation of values represented by the first party transaction characteristic.

In one embodiment, the series of operations includes determining, using population transactions having the matching population transaction characteristic, how much variance is represented by the population transaction characteristic. In one embodiment, the amount of variance is determined by determining a population standard deviation of values represented by the population transaction characteristic.

In one embodiment, the series of operations includes determining a relationship value for a given first party or population transaction characteristic between the first party standard deviation and the population standard deviation. In one embodiment, the relationship value is determined by dividing the first party standard deviation into the population standard deviation. In one embodiment, the relationship value is determined by dividing the first party standard deviation by the population standard deviation.

In one embodiment, the series of operations includes combining, once all relationship values have been determined for all matching first party transaction characteristics, the relationship values into a combined relationship value.

In one embodiment, determining a party weighting value for each first party transaction characteristic that is equivalent to a population transaction characteristic, and which is also equivalent to a results characteristic concludes by dividing each relationship value for each first party transaction characteristic by the associated combined relationship value.

In one embodiment, a process for customizing a user experience based on automatically weighted criteria includes determining, using the population transaction data, a normalizing value for each of the population transaction characteristics of the population transaction data that match one of the results characteristics.

In one embodiment, determining, using the population transaction data, a normalizing value for each of the transaction characteristics of the first party transaction data that matches one of the results characteristics includes determining one or more population transaction characteristics of one or more transactions of the population transaction data.

As discussed above, in one embodiment, the population transaction characteristics include attributes or other details associated with the population transaction data. In one embodiment, one or more of the population transaction characteristics are directly associated with one or more population transactions of the population transaction data, such as, for example, a restaurant name being a payee listed in a population financial transaction of the population transaction data. In one embodiment, one or more of the population transaction characteristics are indirectly associated with, or derived from, one or more population transactions of the population transaction data. For example, in one embodiment, in a population financial transaction listing a restaurant payee, where the address of the restaurant isn't data needed for the population financial transaction to be processed, the address of the restaurant is a population transaction characteristic derived from the payee name, and is determined using the payee name as a search parameter in one or more external databases. Further, by using the address of the payee and a location of the party of the population to which the population transaction applies, one or more of a driving distance, driving time, route, and other population transaction characteristics are derived.

In one embodiment, determining a normalizing value further includes performing a series of operations for each population transaction characteristic that is equivalent to a results characteristic.

In one embodiment, the series of operations includes determining, over population transactions having the results characteristic, how much variability is represented by values associated with the population transaction characteristic. In one embodiment, the amount of variability is determined by determining a population standard deviation of values represented by the population transaction characteristic.

In one embodiment, the series of operations further includes determining, using the values of each population transaction characteristic for each population transaction having the results characteristic, an average of the values of the population transaction characteristic.

In one embodiment, the series of operations further includes determining a first value which is below the average value of the population transaction characteristic, and which captures a predetermined percentage of the available transaction values. In one embodiment, the first value is a value representing one standard deviation below the average value of the population transaction characteristics.

In one embodiment, the series of operations further includes determining a second value which is above the average value of the population transaction characteristic, and which captures a predetermined percentage of the available transaction values. In one embodiment, the second value is a value representing one standard deviation above the average value of the population transaction characteristics.

In one embodiment, the series of operations further includes determining, for each search result associated with the results characteristic, a normalized value for the results characteristic, the normalized value being determined using the first value, the second value, and a results characteristic value associated with the search result.

In one embodiment, a process for customizing a user experience based on automatically weighted criteria further includes combining, for each of the transaction characteristics of the first party transaction data that match one of the results characteristics, the respective normalizing factor and party weighting value, resulting in a combined party rating.

In one embodiment, combining the respective normalizing factor and party weighting value includes multiplying the weighting factor for each first party transaction characteristic and multiplying the result by the normalized value for the same first party transaction characteristic.

In one embodiment, a process for customizing a user experience based on automatically weighted criteria further includes ordering the search results according to the combined party ratings and presenting the search results to the originating computing system.

Through the process for customizing a user experience based on automatically weighted criteria outlined above, less processor time results from personalizing the data according to each user and focusing the data analysis on specific transactional data. Further, fewer searches will be required, due to the personalization of data, since the search results will be tailored specifically to each user based on transactional data representing actions and accomplishments directly associated with the first party.

Figure 1:
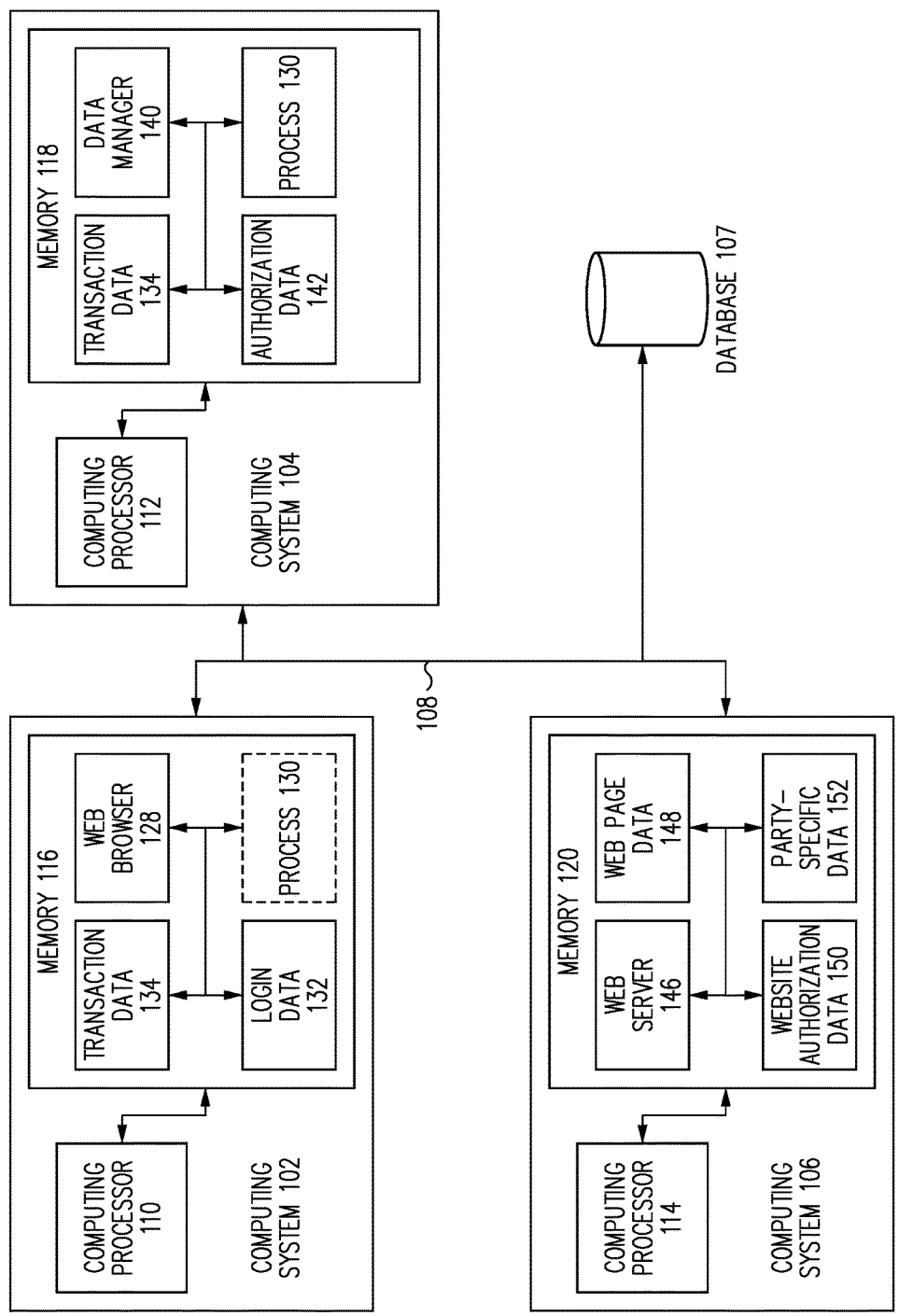
FIG. 1 is a functional block diagram showing the interaction of various elements for implementing one embodiment of a system and method for customizing a user experience based on automatically weighted criteria.

Common reference numerals are used throughout the figures and the detailed description to indicate like elements. One skilled in the art will readily recognize that the above figures are examples and that other architectures, modes of operation, orders of operation and elements/functions can be provided and implemented without departing from the characteristics and features of the invention, as set forth in the claims.

DETAILED DESCRIPTION

In one embodiment, transaction data of a first party and transaction data of a population are both analyzed to determine weighting and normalizing factors, which when applied to data operate to prioritize and personalize the data. The prioritization of the data is based on the analysis and results in use of the data in accordance with user preferences as evidenced in prior activities of the first party represented by the transaction data. In a navigation system, applying data prioritizations speeds performance of the system and eliminates duplicate or follow-on searches, and allows efficient selection of potential routes and destinations.

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

In accordance with one embodiment, a system and method for customizing a user experience based on automatically weighted criteria includes a process for customizing a user experience based on automatically weighted criteria implemented by one or more computing systems.

As used herein, the term "computing system", includes, but is not limited to, a server computing system; a workstation; a desktop computing system; a database system or storage cluster; a switching system; a router; any hardware system; any communications systems; any form of proxy system; a gateway system; a firewall system; a load balancing system; or any device, subsystem, or mechanism that includes components that can execute all, or part, of any one of the processes and/or operations as described herein.

In addition, as used herein, the term computing system, can denote, but is not limited to, systems made up of multiple server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, the one or more computing systems implementing the process for customizing a user experience based on automatically weighted criteria are logically or physically located, and/or associated with, two or more computing environments. As used herein, the term "computing environment" includes, but is not limited to, a logical or physical grouping of connected or networked computing systems using the same infrastructure and systems such as, but not limited to, hardware systems, software systems, and networking/communications systems.

In one embodiment, two or more computing systems, and/or two or more computing environments, are connected by one or more communications channels or networks, and/or distributed computing system networks, such as, but not limited to: a public cloud; a private cloud; a virtual private cloud (VPC); a subnet; any general network, communications network, or general network/communications network system; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" and the term "communication channel" include, but are not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

FIG. 1 is a functional block diagram showing the interaction of various elements for implementing one embodiment of a system and method for customizing a user experience based on automatically weighted criteria.

Referring to FIG. 1, exemplary system 100 includes computing system 102, computing system 104, computing system 106, and database 107, each of which are operatively coupled through communications channel 108.

Of particular note, the various elements in FIG. 1 are shown for illustrative purposes as being associated with specific computing systems, such as computing system 102, computing system 104, and computing system 106. However, the exemplary placement of the various elements within system 100 is made for illustrative purposes only and, in various embodiments, any individual element shown in FIG. 1, or combination of elements shown in FIG. 1, can be implemented and/or deployed on any of one or more various computing environments or systems, and/or architectural or infrastructure components, such as one or more hardware systems, one or more software systems, one or more data centers, one or more cloud computing environments, one or more third party service capabilities, or any other computing environments or systems, architectural, and/or infrastructure components as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, a consumer or other party in control of the one or more computing systems, a financial institution representative, a party and/or entity providing all or a portion of a cloud-based computing environment, the owner of a website or geolocation system, and/or any other party and/or entity providing one or more functions, and/or any other party and/or entity as discussed herein, and/or as known in the art at the time of filing, and/or as made known after the time of filing.

Computing systems 102, 104, and 106 each have respective computing processors 110, 112, and 114, and associated respective memories 116, 118, and 120.

In one embodiment, memory 116 of computing system 102 includes one or more of web browser 128, all or a portion of process 130, login data 132 and transaction data 134.

In practical application, computing system 102 is, in one embodiment, under the control of a party who engages with a search service such as an internet provider, or a geolocation provider such as a GPS provider responsible for providing mapping guidance to parties using their system.

In one embodiment, memory 118 of computing system 104 includes one or more of all or a portion of process 130, data manager 140, transaction data 134, and authorization data 142. Data manager 140 is a management module for performing one or more process operations on one or more process variables used in process 130.

As seen in FIG. 1 depicting system 100, at least a portion of process 130 may be present, or not, at any given time, in any of computing system 102 or computing system 104 as needed, based on the particular design of a particular implementation of system 100. All of or portions of process 130 may be transferable between one or more computing systems, such as computing system 102 and computing system 104, for any reason, such as for efficiency reasons depending on where a particular process operation of process 130 is most efficiently performed.

Correspondingly, either all of or a portion of transaction data 134 is present, in one embodiment, in either or both of computing system 102 and computing system 104. Further, all of or a portion of transaction data stored on or used by computing system 104, such as transaction data 134, may be provided, for example, by a party in control of or otherwise using computing system 102.

In one embodiment, memory 120 of computing system 106 includes one or more of web server 146, web page data 148, website authorization data 150, and party-specific data 152. In one embodiment, web server 146 is configured to provide one or more webpages associated with one or more websites of an entity having transaction data of the party in control of or otherwise using computing system 102, such as a bank, credit union, credit card company, a ratings website, a website for storing one or more activities the party performs, or any other entity involving the recording or storage of any transaction data involving one or more activities of the party.

Upon proper authentication of a consumer user as determined by computing system 106, web server 146 utilizes party-specific data 152 to provide one or more party-specific webpages having transaction data of the party, such as purchase receipts representing level 1 or level 3 purchase item data for purchases made by the party, ratings data of one or more business entities the party has done business with at various times, friends data reflecting data about other people the party is social with, fitness data showing one or more activities the party engages in, or any other transaction data involving the party.

Web browser 128 of computing system 102 is used, in one embodiment, by a party of computing system 102 who, through party input to web browser 128, interacts with one or more process operations of computing system 104 and/or one or more webpages presented to the party of computing system 102 by computing system 106.

Reference is made within this disclosure of, for example, process 130, transaction data 134, login data 132, authorization data 142, web page data 148, website authorization data 150, data manager 140 and party-specific data 152 being present on one or more of computing system 102, computing system 104, or computing system 106. However, any portion of process 130 and or any item of data or set of data may instead be stored within database 107 and retrieved by any computing system when necessary to perform one or more operations of process 130.

In one embodiment, at least a portion of transaction data 134 is acquired through scraping of an entity website, such as a financial institution entity website or a merchant website provided by web server 146. In one embodiment, transaction data 134 is acquired through optical character recognition of electronic images of one or more of invoices, statements, or other data received from an entity having transaction data of the party.

Computing system 104 is, in one embodiment, primarily configured to acquire and analyze transactions of the party and automatically make determinations corresponding to preferences of the party expressed through actions previously performed by the party, such as a party in control of or otherwise using computing system 102. Transaction data of an entity is, in one embodiment, acquired by computing system 104 from one or more different sources, such as transaction data 134 of computing system 102. For example, in one embodiment, a party of computing system 102 utilizes web browser 128 of computing system 102, to become authenticated with a website provided by web server 146.

In one embodiment, a party of computing system 102 interacts through web browser 128 with a website of web server 146 developed using one or more of web page data 148, and party-specific data 152.

In one embodiment, computing system 106 is operated by, or on behalf of, or otherwise under the control of a financial institution or other business entity from which at least a portion of transaction data 134 is received. In one embodiment, computing system 106 provides access to at least a portion of party-specific data 152 without authentication.

In one embodiment, the website of web server 146 requires that the party of computing system 102 be authenticated as an authorized party of the website of web server 146 prior to presenting a party-specific web page to the party of computing system 102. In one embodiment, login data 132 of computing system 102 includes at least a portion of login data of the party of computing system 102, which is compared with at least a portion of website authorization data 150 of computing system 106. If a match exists between at least a portion of login data 132 and at least a portion of website authorization data 150, the party of computing system 102 is authenticated as an authorized user of the website of web server 146, and one or more party-specific web pages are prepared by web server 146 and presented to the party at web browser 128. In one embodiment, at least a portion of transaction data 134 is then acquired through screen-scraping processes performed by computing system 102.

In one embodiment, at least a portion of transaction data 134 is acquired through data transmission from computing system 106 to either or both of computing system 102 or computing system 104.

Similarly, in one embodiment, computing system 104 requires that a party of computing system 102 be authenticated as an authorized party of computing system 104 prior to one or more operations of process 130 being performed on behalf of the party of computing system 102. In one embodiment, login data 132 of computing system 102 includes at least a portion of login data of the party of computing system 102, which is compared with at least a portion of authorization data 142 of computing system 104. If a match exists between at least a portion of login data 132 and at least a portion of authorization data 142, the party of computing system 102 is authenticated as an authorized party of computing system 104.

Transaction data 134 of either or both of computing system 102 and computing system 104 may be acquired in many different ways. In one embodiment, transaction data 134 is acquired by the party of computing system 102 from a webpage of computing system 106, through screen scraping one or more party-specific webpages provided by web server 146 as discussed herein. In one embodiment, transaction data 134 is acquired by computing system 104 logging into computing system 106 on behalf of the party of computing system 102, and screen scraping one or more party-specific webpages provided by web server 146 as discussed herein. In one embodiment, transaction data 134 is acquired by performing optical character recognition on one or more receipts and/or other forms of invoices or statements, by the party or by any other interested person.

Once the party of computing system 102 is authenticated with computing system 106, web server 146 utilizes web page data 148 and party-specific data 152 to present a party-specific webpage for the party of computing system 102. This party-specific webpage is then scraped for transaction data, such as transaction data 134.

Figure 2:
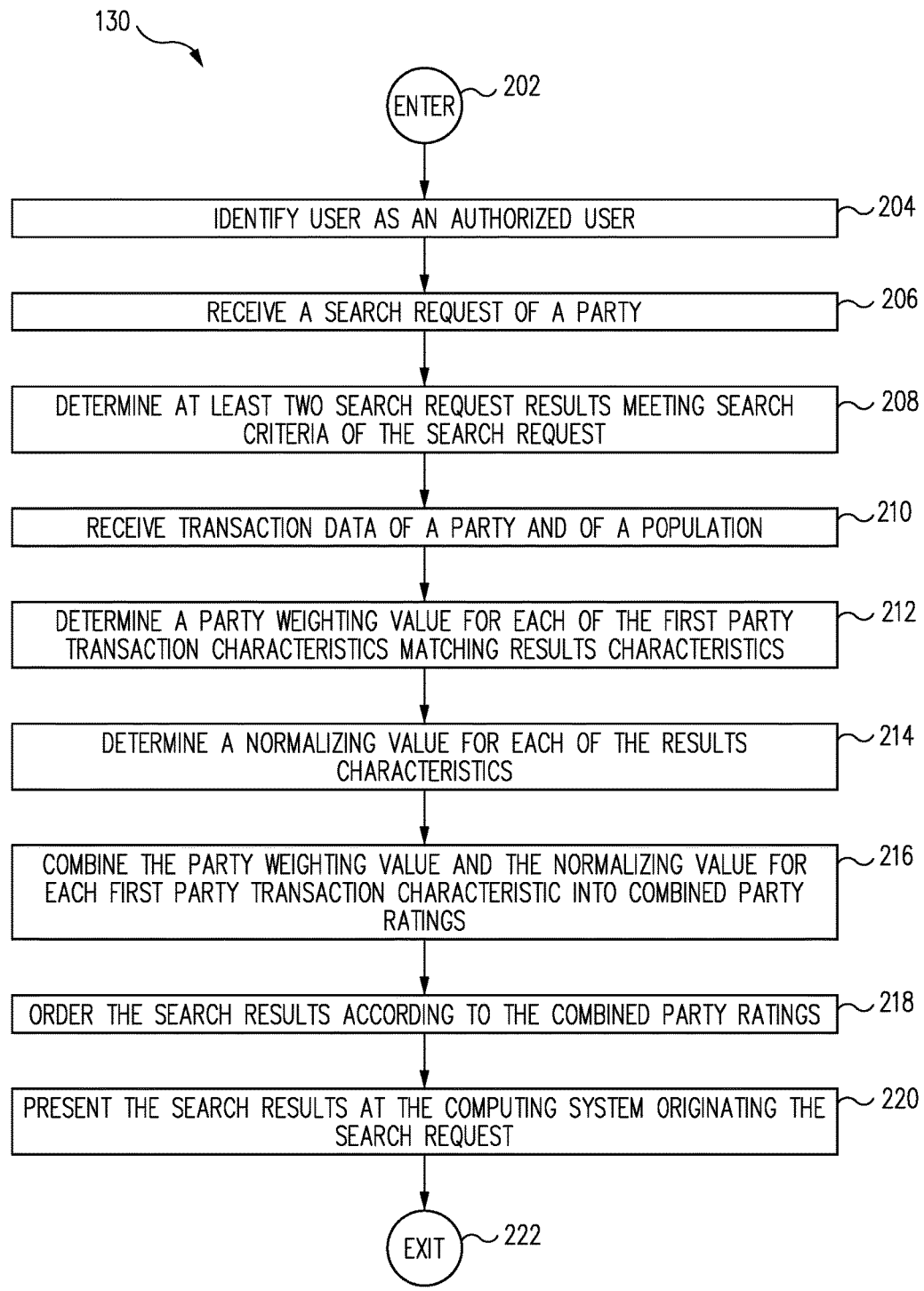
FIG. 2 is an exemplary flowchart depicting a process for customizing a user experience based on automatically weighted criteria in accordance with one embodiment.

FIG. 2 is an exemplary flowchart depicting a process for customizing a user experience based on automatically weighted criteria in accordance with one embodiment.

Referring to FIG. 1 and FIG. 2 together, process 130 begins with ENTER OPERATION 202 and proceeds with IDENTIFY USER AS AN AUTHORIZED USER OPERATION 204.

In one embodiment, at IDENTIFY USER AS AN AUTHORIZED USER OPERATION 204, a user, such as a party in control of or otherwise operating computing system 102, is authenticated by computing system 104 as an authorized user of computing system 104.

In one embodiment, computing system 104 requires that a party of computing system 102 be authenticated as an authorized party of computing system 104 prior to performing one or more additional operations of process 130 on behalf of the party of computing system 102. In one embodiment, login data 132 of computing system 102 includes at least a portion of login data of the party of computing system 102, which is compared with at least a portion of authorization data 142 of computing system 104. If a match exists between at least a portion of login data 132 and at least a portion of authorization data 142, the party of computing system 102 is authenticated as an authorized party of computing system 104.

In one embodiment, at IDENTIFY USER AS AN AUTHORIZED USER OPERATION 204, a party, such as a party in control of or otherwise operating computing system 102, is authenticated by computing system 106 as an authorized user of computing system 106.

In one embodiment, the website of web server 146 of computing system 106 requires that the party of computing system 102 be authenticated as an authorized party of the website of web server 146 prior to web server 146 presenting a party-specific web page to the party of computing system 102. In one embodiment, login data 132 of computing system 102 includes at least a portion of login data of the user of computing system 102, which is compared with at least a portion of website authorization data 150 of computing system 106. If a match exists between at least a portion of login data 132 and at least a portion of website authorization data 150, the party of computing system 102 is authenticated as an authorized party of the website of web server 146 and one or more party-specific web pages are prepared by web server 146 and presented to the party at web browser 128.

In one embodiment, following authentication of a user at IDENTIFY USER AS AN AUTHORIZED USER OPERATION 204, process flow proceeds with RECEIVE A SEARCH REQUEST OF A PARTY OPERATION 206.

In one embodiment, at RECEIVE A SEARCH REQUEST OF A PARTY OPERATION 206, a search request is first received at computing system 102, and then is optionally transferred from computing system 102 to another computing system, such as either of computing system 104 or computing system 106. In one embodiment, the search request is received through party input provided by a party in control of, or otherwise operating computing system 102. In one embodiment, the search request is received through party input provided by a party through web browser 128 of computing system 102. In one embodiment, computing system 102 is configured as a location-aware computing system and includes functionality to provide turn by turn or other travel related guidance to a party desiring to get from a first location, such as their present location, to a second location selected based at least partly on results of the search request.

In one embodiment, the search request received at RECEIVE A SEARCH REQUEST OF A PARTY OPERATION 206, is a search request for a type of business entity, such as a type of restaurant, a type of merchant, or any other type of business entity. In one embodiment, the search request received at RECEIVE A SEARCH REQUEST OF A PARTY OPERATION 206, is a search request for a type of product and/or service, such as a type of food, a type of car, or a service, such as a car wash, a haircut, a dog boarding service, or any other type of product and/or service.

In one embodiment, following receipt of a search request at RECEIVE A SEARCH REQUEST OF A PARTY OPERATION 206, process flow proceeds with DETERMINE AT LEAST TWO SEARCH REQUEST RESULTS MEETING SEARCH CRITERIA OF THE SEARCH REQUEST OPERATION 208.

In one embodiment, at DETERMINE AT LEAST TWO SEARCH REQUEST RESULTS MEETING SEARCH CRITERIA OF THE SEARCH REQUEST OPERATION 208, a search is performed against data in one or more databases and at least two search request results are determined which meets search criteria specified for the search. In one embodiment, the search criteria is at least partly provided within data representing the search request received at RECEIVE A SEARCH REQUEST OF A PARTY OPERATION 206. In one embodiment, the at least two search request results have one or more results characteristics associated with them. In one embodiment, one or more of the at least two search request results share one or more results characteristics. In one embodiment, at least one of the at least two search request results has a unique results characteristic not shared with any other search request result. In one embodiment, results characteristics are substantially similar to first party transaction characteristics and population transaction characteristics described below, except that results characteristics are associated with search results, while first party transaction characteristics are associated with party transactions of the party transaction data, and population transaction characteristics are associated with transactions of one or more parties of the population transaction data.

In one embodiment, following the determination of at least two search request results at DETERMINE AT LEAST TWO SEARCH REQUEST RESULTS MEETING SEARCH CRITERIA OF THE SEARCH REQUEST OPERATION 208, process flow proceeds with RECEIVE TRANSACTION DATA OF A PARTY AND OF A POPULATION OPERATION 210.

In one embodiment, at RECEIVE TRANSACTION DATA OF A PARTY AND OF A POPULATION OPERATION 210, transaction data of a party is received from one or more databases, such as an internal memory location, such as memory 116 of computing system 102 or memory 118 of computing system 104, or another computing system coupled to communications channel 108.

In one embodiment, the received party transaction data includes individual party transactions having first party transaction characteristics associated with the party.

In one embodiment, the party transaction data includes data evidencing one or more financial transactions of the party, such as financial transaction data received from a bank or other financial institution or financial transaction data provided by or on behalf of the party. In one embodiment, other transactions are included in the party transaction data, such as rating transactions including one or more ratings of one or more business entities or other entities, such as one or more restaurants rated by the party, historical location information reflecting one or more locations traveled by the party, historical location information reflecting recurring travel routes of the party, origin locations and/or destination locations of the party, travel logs reflecting one or more locations the party stayed overnight, travel logs reflecting recurring overnight stays over a period of time, and any other transaction data reflecting the first party performing one or more activities.

In one embodiment, the first party transaction characteristics include attributes or other details associated with the party transaction data. In one embodiment, one or more of the first party transaction characteristics are directly associated with one or more party transactions of the party transaction data, such as, for example, a restaurant name being a payee listed in a party financial transaction of the party transaction data. In one embodiment, one or more of the first party transaction characteristics are indirectly associated with, or derived from, one or more party transactions of the party transaction data. For example, in a party financial transaction listing a restaurant as a payee, where the address of the restaurant isn't data needed for the party financial transaction to be processed, the address of the restaurant is a party transaction characteristic derived from the payee name, and is determined, in one embodiment, using the payee name as a search parameter in one or more databases. Further, by using the address of the payee and a location of the party, one or more of a driving distance, driving time, a likely or actual route, and other first party transaction characteristics are derived, for example, by determining a distance between a location of the party and a location of the payee, by assuming a typical driving speed based on collected data over the determined distance using a likely or actual route traveled, and through any other means of deriving additional data now known or later developed.

In one embodiment, at RECEIVE TRANSACTION DATA OF A PARTY AND OF A POPULATION OPERATION 210, transaction data of one or more parties of a population is received from one or more databases, such as an internal memory location, such as memory 116 of computing system 102 or memory 118 of computing system 104, or another computing system coupled to communications channel 108.

In one embodiment, a process for customizing a user experience based on automatically weighted criteria includes receiving population transaction data for a population of parties other than the party, the population transaction data including individual population transactions having population transaction characteristics associated with parties of the population.

In one embodiment, the party transaction data includes data evidencing one or more financial transactions of one or more parties of the population, such as financial transaction data received from a bank or other financial institution, or financial transaction data provided by or on behalf of the ones of the parties of the population. In one embodiment, other transactions are included in the population transaction data, such as rating transactions including one or more ratings of one or more business entities or other entities, such as one or more restaurants rated by one or more parties of the population, historical location information reflecting one or more locations traveled by one or more parties of the population, historical location information reflecting recurring travel routes of one or more parties of the population, origin locations and/or destination locations of one or more parties of the population, travel logs reflecting one or more locations one or more parties of the population stayed overnight, travel logs reflecting recurring overnight stays over a period of time, and any other transaction data reflecting one or more parties of the population performing one or more activities.

In one embodiment, the population transaction characteristics include attributes or other details associated with the population transaction data. In one embodiment, one or more of the population transaction characteristics are directly associated with one or more population transactions of the population transaction data, such as, for example, a restaurant name being a payee listed in a population financial transaction of the population transaction data. In one embodiment, one or more of the population transaction characteristics are indirectly associated with, or derived from, one or more population transactions of the population transaction data. For example, in a population financial transaction listing a restaurant as a payee, where the address of the restaurant isn't data needed for the population financial transaction to be processed, the address of the restaurant is a population transaction characteristic derived from the payee name, and is determined, in one embodiment, using the payee name as a search parameter in one or more databases. Further, by using the address of the payee and a location of one or more parties of the population, one or more of a driving distance of one or more parties of the population, driving time of one or more parties of the population, a likely or actual route of one or more parties of the population, and other first party transaction characteristics are derived, for example, by determining a distance between a location of one or more parties of the population and a location of the payee, by assuming a typical driving speed based on collected data over the determined distance using a likely or actual route traveled, and through any other means of deriving additional data now known or later developed.

In one embodiment, after party and population transaction data is received at RECEIVE TRANSACTION DATA OF A PARTY AND OF A POPULATION OPERATION 210, process flow proceeds with DETERMINE A PARTY WEIGHTING VALUE FOR EACH OF THE FIRST PARTY TRANSACTION CHARACTERISTICS MATCHING RESULTS CHARACTERISTICS OPERATION 212.

In one embodiment, at DETERMINE A PARTY WEIGHTING VALUE FOR EACH OF THE FIRST PARTY TRANSACTION CHARACTERISTICS MATCHING RESULTS CHARACTERISTICS OPERATION 212, a party weighting value is determined for one or more first party transaction characteristics associated with transactions of the first party transaction data. In one embodiment, a party weighting value is determined for one or more first party transaction characteristics regardless of whether the associated first party transaction characteristics are matched with one or more results characteristics. In one embodiment, a party weighting value is determined for one or more first party transaction characteristics only after respective first party transaction characteristics are matched with one or more results characteristics.

In one embodiment, first party transactions of the first party transaction data are grouped according to the associated first party transaction characteristics. In one embodiment, one or more first party transactions have two or more associated first party transaction characteristics, and therefore belong to two or more groups of transaction characteristics.

In one embodiment, at DETERMINE A PARTY WEIGHTING VALUE FOR EACH OF THE FIRST PARTY TRANSACTION CHARACTERISTICS MATCHING RESULTS CHARACTERISTICS OPERATION 212, a party weighting value is determined for each group of first party transactions that have a transaction characteristic matching a results characteristic. In one embodiment, and in one example, first party transactions having a first party transaction characteristic indicating that the first party transactions involve restaurants have additional data associated with them that is either directly associated or is derived, with the additional data indicating distance values ranging from 2 miles to 18 miles, indicating that restaurants that the first party has engaged in transactions with are between 2 and 18 miles away from a location of the first party.

In one embodiment, the party weighting value associated with the "distance" first party transaction characteristic is assigned in order to represent how important the distance transaction characteristic is to the first party. In one embodiment, the importance of a given transaction characteristic is deemed to be higher if the variability of values associated with the transaction characteristic is lower. For example, if a high percentage of the distance values of the example above are clustered within a particular distance range, such as a distance range of between 5 and 7 miles, a determination is made that the distance range is important to the first party, and a party weighting value reflecting that level of importance is assigned to the distance-related transaction characteristic.

More details reflecting one embodiment of determining a party weighting value will be discussed below.

Once a party weighting value is determined, at DETERMINE A PARTY WEIGHTING VALUE FOR EACH OF THE FIRST PARTY TRANSACTION CHARACTERISTICS MATCHING RESULTS CHARACTERISTICS OPERATION 212, for each group of first party transactions that have a transaction characteristic matching a results characteristic, process flow proceeds with DETERMINE A NORMALIZING VALUE FOR EACH OF THE RESULTS CHARACTERISTICS OPERATION 214.

In one embodiment, at DETERMINE A NORMALIZING VALUE FOR EACH OF THE RESULTS CHARACTERISTICS OPERATION 214, a normalizing value is determined for one or more results characteristics of the search results. In one embodiment, a normalizing value is determined for one or more results characteristics of the search results regardless of whether the particular results characteristics are matched with one or more first party transaction characteristics. In one embodiment, a normalizing value is determined for one or more results characteristics only for respective normalizing characteristics that are matched with one or more first party transaction characteristics.

In one embodiment, search results are grouped according to their associated results characteristics. In one embodiment, one or more search results have two or more associated results characteristics, and therefore belong to two or more groups of results characteristics.

In one embodiment, at DETERMINE A NORMALIZING VALUE FOR EACH OF THE RESULTS CHARACTERISTICS OPERATION 214, and in one example, search results having results characteristics indicating that the search results involve entities, such as restaurants, have additional data associated with them that is either directly associated or is derived, with the additional data indicating a range of distances from the first party of 4 to 12 miles, indicating that the restaurants of the search results are between 4 and 12 miles away from a location of the first party.

In one embodiment, the normalizing value associated with the "distance" results characteristic is determined such that normalized search results fall within a predetermined range, such as a range of 1 to 100. Additional detail as to how to determine a normalizing value for results characteristics will be presented below.

In one embodiment, once all appropriate normalizing values are determined at DETERMINE A NORMALIZING VALUE FOR EACH OF THE RESULTS CHARACTERISTICS OPERATION 214, process flow proceeds with COMBINE THE PARTY WEIGHTING VALUE AND THE NORMALIZING VALUE FOR EACH FIRST PARTY TRANSACTION CHARACTERISTIC INTO COMBINED PARTY RATINGS OPERATION 216.

In one embodiment, at COMBINE THE PARTY WEIGHTING VALUE AND THE NORMALIZING VALUE FOR EACH FIRST PARTY TRANSACTION CHARACTERISTIC INTO COMBINED PARTY RATINGS OPERATION 216, a determination is made as to which first party transaction characteristics match one or more results characteristics. For each first party transaction characteristic that matches a results characteristic, the respective party weighting value of the first party transaction characteristic is combined with the normalizing value associated with the matching results characteristic, resulting in a combined party rating.

In one embodiment, respective party weighting values are multiplied by the normalized value associated with the corresponding results characteristic. However, many different techniques for combining normalizing values with party rating values are possible, such as dividing the party weighting value by the respective normalizing value, dividing the normalizing value by the respective party weighting value, or any other technique for combining a normalizing value with a party rating value, depending on the needs of a particular implementation.

In one embodiment, once the party weighting values are combined with respective ones of the normalizing values, at COMBINE THE PARTY WEIGHTING VALUE AND THE NORMALIZING VALUE FOR EACH FIRST PARTY TRANSACTION CHARACTERISTIC INTO COMBINED PARTY RATINGS OPERATION 216, resulting in a combined party rating, process flow proceeds with ORDER THE SEARCH RESULTS ACCORDING TO THE COMBINED PARTY RATINGS OPERATION 218.

In one embodiment, at ORDER THE SEARCH RESULTS ACCORDING TO THE COMBINED PARTY RATINGS OPERATION 218, the search results previously determined at DETERMINE AT LEAST TWO SEARCH REQUEST RESULTS MEETING SEARCH CRITERIA OF THE SEARCH REQUEST OPERATION 208 are ordered according to the respective combined party ratings determined at COMBINE THE PARTY WEIGHTING VALUE AND THE NORMALIZING VALUE FOR EACH FIRST PARTY TRANSACTION CHARACTERISTIC INTO COMBINED PARTY RATINGS OPERATION 216.

By ordering the search request results according to the combined party ratings, the search results are ordered according to the personal preferences of the first party as evidenced by one or more first party transactions of the first party transaction data, and thus are ordered according to the personal preferences of the first party as evidenced by actual activities previously performed by the first party. This result is in direct contrast with prior art systems that typically order search results based on expressed preferences of a party where the party provides user input into the search screen or otherwise states a preference.

In one embodiment, once the search results are ordered according to the combined party ratings at ORDER THE SEARCH RESULTS ACCORDING TO THE COMBINED PARTY RATINGS OPERATION 218, process flow proceeds with PRESENT THE SEARCH RESULTS AT THE COMPUTING SYSTEM ORIGINATING THE SEARCH REQUEST OPERATION 220.

In one embodiment, at PRESENT THE SEARCH RESULTS AT THE COMPUTING SYSTEM ORIGINATING THE SEARCH REQUEST OPERATION 220, the ordered search results are presented to the originating computing system.

In one embodiment, as explained above, the originating computing system is configured as a navigation system, and the search received at RECEIVE A SEARCH REQUEST OF A PARTY OPERATION 206 is a search for a type of restaurant, such as an Italian restaurant, a Mexican restaurant, a restaurant serving Southern cuisine, or any other type of restaurant. In one embodiment, following the determination of one or more party weighting values corresponding to characteristics of transactions that the first party has performed, and also following the determination of one or more normalizing values of restaurants or other entities located during the search and thus presented as search results, the search results are ordered according to user preferences as expressed in the party weighting values. The search results are then presented to the navigation system at PRESENT THE SEARCH RESULTS AT THE COMPUTING SYSTEM ORIGINATING THE SEARCH REQUEST OPERATION 220.

Following the presentation of results, at PRESENT THE SEARCH RESULTS AT THE COMPUTING SYSTEM ORIGINATING THE SEARCH REQUEST OPERATION 220, PROCESS FLOW PROCEEDS WITH EXIT OPERATION 222 and the process exits, awaiting further input or data.

Using this improvement to a navigation system, for example, the navigation system becomes significantly more efficient because the need for multiple searches is significantly diminished or eliminated altogether, and the most likely best search result is presented at the top of a search results list, thus requiring fewer iterations of the search results in order to find one or more search results acceptable to the first party.

In the discussion above, information was presented regarding the determination of one or more party weighting values at DETERMINE A PARTY WEIGHTING VALUE FOR EACH OF THE FIRST PARTY TRANSACTION CHARACTERISTICS MATCHING RESULTS CHARACTERISTICS OPERATION 212.

Figure 3:
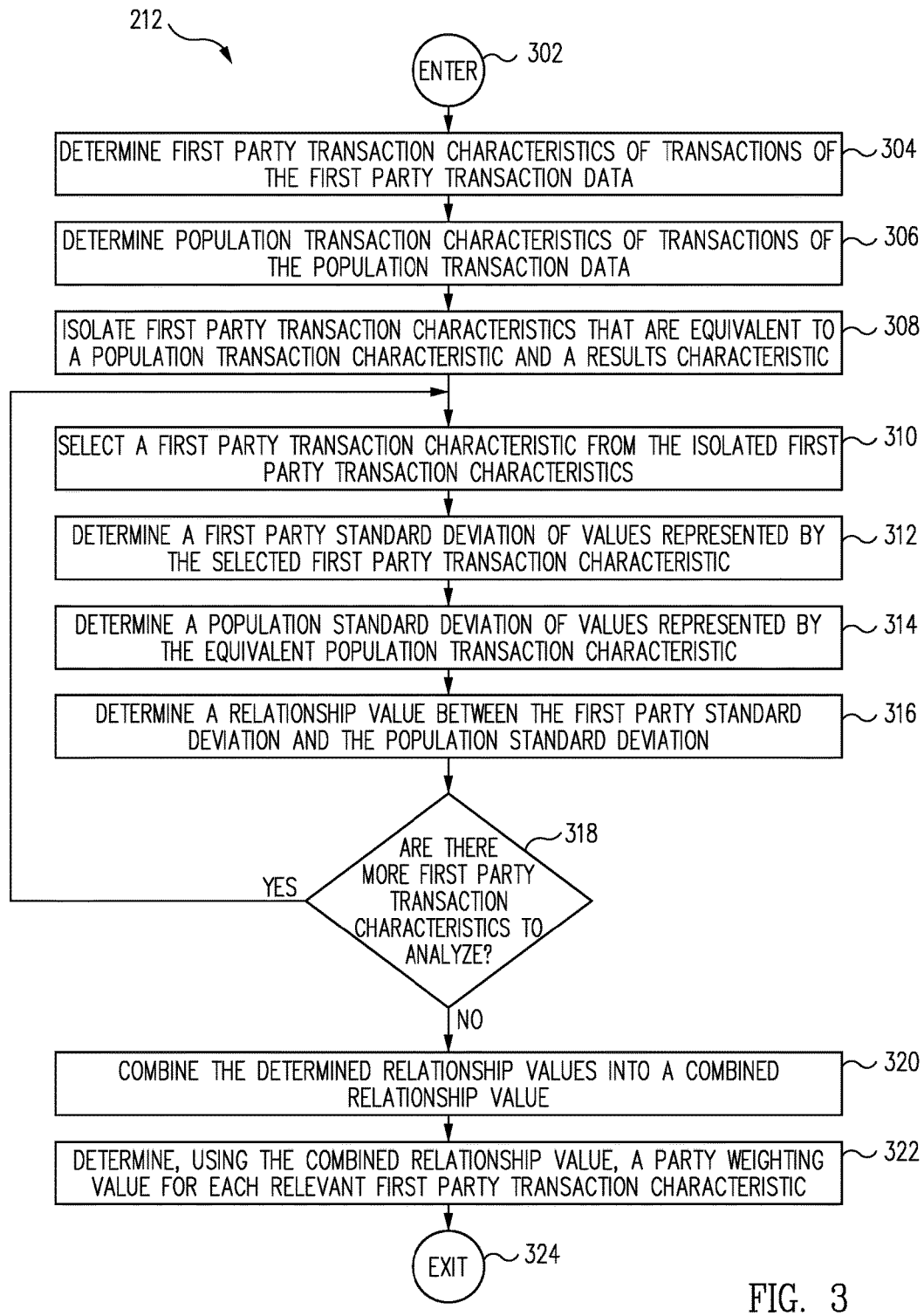
FIG. 3 is an exemplary flowchart depicting a process for determining party weighting factors in accordance with one embodiment.
Figure 4:
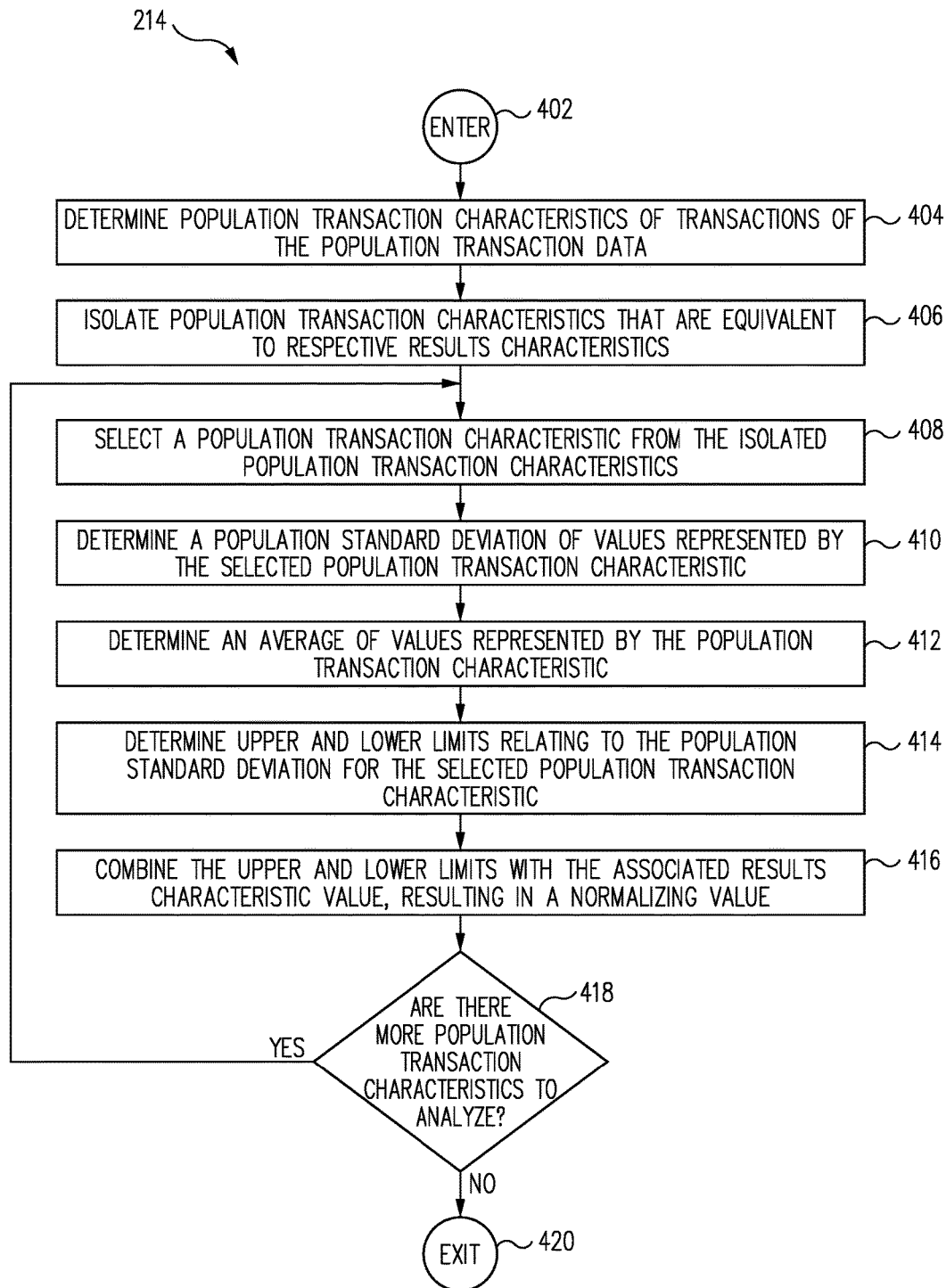
FIG. 4 is an exemplary flowchart depicting a process for determining normalizing factors in accordance with one embodiment.

FIG. 3 is an exemplary flowchart depicting a process for determining party weighting factors in accordance with one embodiment.

Referring to FIG. 3, in one embodiment, process operations for DETERMINE A PARTY WEIGHTING VALUE FOR EACH OF THE FIRST PARTY TRANSACTION CHARACTERISTICS MATCHING RESULTS CHARACTERISTICS OPERATION 212 begins at ENTER OPERATION 302 AND proceeds with DETERMINE FIRST PARTY TRANSACTION CHARACTERISTICS OF TRANSACTIONS OF THE FIRST PARTY TRANSACTION DATA OPERATION 304.

In one embodiment, at DETERMINE FIRST PARTY TRANSACTION CHARACTERISTICS OF TRANSACTIONS OF THE FIRST PARTY TRANSACTION DATA OPERATION 304, one or more first party transaction characteristics of transactions of the first party transaction data are determined through an analysis of the first party transaction data.

In one embodiment, the first party transaction characteristics include attributes or other details associated with the party transaction data. In one embodiment, one or more of the first party transaction characteristics are directly associated with one or more party transactions of the party transaction data, such as, for example, a restaurant name being a payee listed in a party financial transaction of the party transaction data, the price of a meal purchased by the first party at the restaurant, one or more individual items that the meal included, their prices, or any other first party transaction characteristics. In one embodiment, one or more of the first party transaction characteristics are indirectly associated with or derived from one or more party transactions of the party transaction data. For example, in a party financial transaction listing a restaurant as a payee, where the address of the restaurant isn't data needed for the party financial transaction to be processed, the address of the restaurant is a party transaction characteristic derived from the payee name, and is determined, in one embodiment, using the payee name as a search parameter in one or more databases. Further, by using the address of the payee and a location of the party, one or more of a driving distance, driving time, a likely or actual route, and other first party transaction characteristics are derived, for example, by determining a distance between a location of the party and a location of the payee, by assuming a typical driving speed based on collected data over the determined distance using a likely or actual route traveled, and through any other means of deriving additional data now known or later developed.

In one embodiment, once first party transaction characteristics have been determined at DETERMINE FIRST PARTY TRANSACTION CHARACTERISTICS OF TRANSACTIONS OF THE FIRST PARTY TRANSACTION DATA OPERATION 304, process flow proceeds with DETERMINE POPULATION TRANSACTION CHAR-

ACTERISTICS OF TRANSACTIONS OF THE POPULATION TRANSACTION DATA OPERATION 306.

In one embodiment, at DETERMINE POPULATION TRANSACTION CHARACTERISTICS OF TRANSACTIONS OF THE POPULATION TRANSACTION DATA OPERATION 306, one or more population transaction characteristics of transactions of the population transaction data are determined through an analysis of the population transaction data.

In one embodiment, the population transaction characteristics include attributes or other details associated with the population transaction data. In one embodiment, transactions of the population transaction data are individual transactions of individual parties of the population, and thus include transactions accomplished by any party of the population performing any activity.

In one embodiment, one or more of the population transaction characteristics are directly associated with one or more population transactions of the population transaction data, such as, for example, a restaurant name being a payee listed in a financial transaction of a party of the population, the price of a meal purchased by the party of the population at the restaurant, one or more individual items that the meal included, and their prices, or any other population transaction characteristics. In one embodiment, one or more of the population transaction characteristics are indirectly associated with, or derived from, one or more party transactions of the party transaction data. For example, in a party financial transaction listing a restaurant as a payee, where the address of the restaurant isn't data needed for the party financial transaction to be processed, the address of the restaurant is a party transaction characteristic derived from the payee name, and is determined, in one embodiment, using the payee name as a search parameter in one or more databases. Further, by using the address of the payee and a location of the party, one or more of a driving distance, driving time, a likely or actual route, and other population transaction characteristics are derived, for example, by determining a distance between a location of the party and a location of the payee, by assuming a typical driving speed based on collected data over the determined distance using a likely or actual route traveled, and through any other means of deriving additional data now known or later developed.

In one embodiment, once population transaction characteristics have been determined at DETERMINE POPULATION TRANSACTION CHARACTERISTICS OF TRANSACTIONS OF THE POPULATION TRANSACTION DATA OPERATION 306, process flow proceeds with ISOLATE FIRST PARTY TRANSACTION CHARACTERISTICS THAT ARE EQUIVALENT TO A POPULATION TRANSACTION CHARACTERISTIC AND A RESULTS CHARACTERISTIC OPERATION 308.

In one embodiment, at ISOLATE FIRST PARTY TRANSACTION CHARACTERISTICS THAT ARE EQUIVALENT TO A POPULATION TRANSACTION CHARACTERISTIC AND A RESULTS CHARACTERISTIC OPERATION 308, first party transaction characteristics are compared with population transaction characteristics and results characteristics, and first party transaction characteristics that are equivalent to a population transaction characteristic and a results characteristic are set aside for further processing. In one embodiment, first party transaction characteristics that are not equivalent to those of a population transaction characteristic and a results characteristic are not considered further.

In one embodiment, regardless of which kinds of transaction characteristics or results characteristics are being considered, the particular transaction characteristics and the particular results characteristics are of a type and have a value, and the type and value are received, in one embodiment, when the transaction data and/or search results are received or determined. In one embodiment, using the example discussed above, a first party transaction characteristic of a type "distance" has a value, such as two miles, four miles, 17 miles, or any other value that is appropriate for a particular first party transaction having that particular first party transaction characteristic. Similarly, a population transaction characteristic of a type "distance" has a value, such as two miles, four miles, 17 miles, or any other value that is appropriate for a particular population transaction having that particular population transaction characteristic. Finally, a results characteristic of the type "distance" also has a value associated with it, such as a value determined at the time the search is performed. For example, a restaurant search result having a results characteristic of the type "distance" may determine a value to be associated with that results characteristic by determining how far the restaurant is from a location of a party performing a search, such as a home location, a present location, or any other location associated with the party.

In one embodiment, the comparison may be made in several different ways. Further, in one embodiment, the comparison is made of the type of transaction characteristic or results characteristic, and is thus not made based on the value of the transaction characteristic or results characteristic.

In one embodiment, for example, population transaction characteristics may first be considered with results characteristics and only population transaction characteristics that are of the same type as at least one results characteristic are set aside for further processing. Then, a comparison may be made between the population transaction characteristics that were set aside and the first party transaction characteristics. An affirmative result of the comparison between the type associated with population transaction characteristics that were set aside and the type associated with first party transaction characteristics results in an isolated set of first party transaction characteristics having equivalent types, and which share the same type with a population transaction characteristic and a results characteristic.

In one embodiment, once first party transaction characteristics have been isolated at ISOLATE FIRST PARTY TRANSACTION CHARACTERISTICS THAT ARE EQUIVALENT TO A POPULATION TRANSACTION CHARACTERISTIC AND A RESULTS CHARACTERISTIC OPERATION 308, process flow proceeds with SELECT A FIRST PARTY TRANSACTION CHARACTERISTIC FROM THE ISOLATED FIRST PARTY TRANSACTION CHARACTERISTICS OPERATION 310.

In one embodiment, at SELECT A FIRST PARTY TRANSACTION CHARACTERISTIC FROM THE ISOLATED FIRST PARTY TRANSACTION CHARACTERISTICS OPERATION 310, at least two first party transaction characteristics are within the first party transaction characteristics isolated at ISOLATE FIRST PARTY TRANSACTION CHARACTERISTICS THAT ARE EQUIVALENT TO A POPULATION TRANSACTION CHARACTERISTIC AND A RESULTS CHARACTERISTIC OPERATION 308.

If there is only one first party transaction characteristic that is a member of the group of isolated first party transaction characteristics that are equivalent to a population transaction characteristic and a results characteristic, in one embodiment, there is no need to determine a party weighting value and a normalizing value. In this limited case, the search results that have results characteristics that match a first party transaction characteristic and a population transaction characteristic will be ordered at the top of any search result presentation to the originating computing system.

In one embodiment, at SELECT A FIRST PARTY TRANSACTION CHARACTERISTIC FROM THE ISOLATED FIRST PARTY TRANSACTION CHARACTERISTICS OPERATION 310, a first party transaction characteristic is selected from the isolated first party transaction characteristics. The remaining first party transaction characteristics will be selected one at a time in turn.

In one embodiment, once a first party transaction characteristic is selected from the isolated first party transaction characteristics, at SELECT A FIRST PARTY TRANSACTION CHARACTERISTIC FROM THE ISOLATED FIRST PARTY TRANSACTION CHARACTERISTICS OPERATION 310, process flow proceeds with DETERMINE A FIRST PARTY STANDARD DEVIATION OF VALUES REPRESENTED BY THE SELECTED FIRST PARTY TRANSACTION CHARACTERISTIC OPERATION 312.

In one embodiment, at DETERMINE A FIRST PARTY STANDARD DEVIATION OF VALUES REPRESENTED BY THE SELECTED FIRST PARTY TRANSACTION CHARACTERISTIC OPERATION 312, the selected first party transaction characteristic is associated with two or more first party transactions, each of which have first party transaction characteristic values associated with them. In one embodiment, at DETERMINE A FIRST PARTY STANDARD DEVIATION OF VALUES REPRESENTED BY THE SELECTED FIRST PARTY TRANSACTION CHARACTERISTIC OPERATION 312, a first party standard deviation is determined using the various first party transaction characteristic values associated with the selected first party transaction characteristic. In one embodiment, the standard deviation of values is determined by taking the square root of the average of the squared differences of the values from their average value.

In one embodiment, once a first party standard deviation of values is determined at DETERMINE A FIRST PARTY STANDARD DEVIATION OF VALUES REPRESENTED BY THE SELECTED FIRST PARTY TRANSACTION CHARACTERISTIC OPERATION 312, process flow proceeds with DETERMINE A POPULATION STANDARD DEVIATION OF VALUES REPRESENTED BY THE EQUIVALENT POPULATION TRANSACTION CHARACTERISTIC OPERATION 314.

In one embodiment, at DETERMINE A POPULATION STANDARD DEVIATION OF VALUES REPRESENTED BY THE EQUIVALENT POPULATION TRANSACTION CHARACTERISTIC OPERATION 314, the population transaction characteristic that is equivalent to the selected first party transaction characteristic is associated with two or more population transactions, each of which have population transaction characteristic values associated with them. In one embodiment, at DETERMINE A POPULATION STANDARD DEVIATION OF VALUES REPRESENTED BY THE EQUIVALENT POPULATION TRANSACTION CHARACTERISTIC OPERATION 314, a population standard deviation is determined using the various population transaction characteristic values associated with the equivalent population transaction characteristic. In one embodiment, the standard deviation of values is determined by taking the square root of the average of the squared differences of the values from their average value.

In one embodiment, once a population standard deviation of values is determined at DETERMINE A POPULATION STANDARD DEVIATION OF VALUES REPRESENTED BY THE EQUIVALENT POPULATION TRANSACTION CHARACTERISTIC OPERATION 314, process flow proceeds with DETERMINE A RELATIONSHIP VALUE BETWEEN THE FIRST PARTY STANDARD DEVIATION AND THE POPULATION STANDARD DEVIATION OPERATION 316.

In one embodiment, at DETERMINE A RELATIONSHIP VALUE BETWEEN THE FIRST PARTY STANDARD DEVIATION AND THE POPULATION STANDARD DEVIATION OPERATION 316, a relationship value is determined for the selected first party transaction characteristic by dividing the population standard deviation by the first party standard deviation, for the particular transaction characteristic. The relationship value is then stored for later use.

In one embodiment, once a relationship value has been determined for the selected first party transaction characteristic at DETERMINE A RELATIONSHIP VALUE BETWEEN THE FIRST PARTY STANDARD DEVIATION AND THE POPULATION STANDARD DEVIATION OPERATION 316, process flow proceeds with ARE THERE MORE FIRST PARTY TRANSACTION CHARACTERISTICS TO ANALYZE? OPERATION 318.

In one embodiment, at ARE THERE MORE FIRST PARTY TRANSACTION CHARACTERISTICS TO ANALYZE? OPERATION 318, a determination is made as to whether all first party transaction characteristics isolated at ISOLATE FIRST PARTY TRANSACTION CHARACTERISTICS THAT ARE EQUIVALENT TO A POPULATION TRANSACTION CHARACTERISTIC AND A RESULTS CHARACTERISTIC OPERATION 308 have had relationship values determined for them. If there are more first party transaction characteristics to analyze, process flow proceeds again with SELECT A FIRST PARTY TRANSACTION CHARACTERISTIC FROM THE ISOLATED FIRST PARTY TRANSACTION CHARACTERISTICS OPERATION 310 as previously outlined.

In one embodiment, if, at ARE THERE MORE FIRST PARTY TRANSACTION CHARACTERISTICS TO ANALYZE? OPERATION 318, there are no more first party transaction characteristics to analyze, and thus each of the first party transaction characteristics isolated at ISOLATE FIRST PARTY TRANSACTION CHARACTERISTICS THAT ARE EQUIVALENT TO A POPULATION TRANSACTION CHARACTERISTIC AND A RESULTS CHARACTERISTIC OPERATION 308 have had relationship values determined for them, process flow proceeds with COMBINE THE DETERMINED RELATIONSHIP VALUES INTO A COMBINED RELATIONSHIP VALUE OPERATION 320.

In one embodiment, at COMBINE THE DETERMINED RELATIONSHIP VALUES INTO A COMBINED RELATIONSHIP VALUE OPERATION 320, each of the relationship values previously determined at DETERMINE A RELATIONSHIP VALUE BETWEEN THE FIRST PARTY STANDARD DEVIATION AND THE POPULATION STANDARD DEVIATION OPERATION 316 are combined into a single combined relationship value. In one embodiment, at COMBINE THE DETERMINED RELATIONSHIP VALUES INTO A COMBINED RELATIONSHIP VALUE OPERATION 320, each of the relationship values previously determined at DETERMINE A RELATIONSHIP VALUE BETWEEN THE FIRST PARTY STANDARD DEVIATION AND THE POPULATION STANDARD DEVIATION OPERATION 316 are added together to determine a denominator which will be used to determine how each relationship value is transformed into a party weighting value.

In one embodiment, once all relationship values previously determined at DETERMINE A RELATIONSHIP VALUE BETWEEN THE FIRST PARTY STANDARD DEVIATION AND THE POPULATION STANDARD DEVIATION OPERATION 316 have been combined into a single combined relationship value, process flow proceeds with DETERMINE, USING THE COMBINED RELATIONSHIP VALUE, A PARTY WEIGHTING VALUE FOR EACH RELEVANT FIRST PARTY TRANSACTION CHARACTERISTIC OPERATION 322.

In one embodiment, at DETERMINE, USING THE COMBINED RELATIONSHIP VALUE, A PARTY WEIGHTING VALUE FOR EACH RELEVANT FIRST PARTY TRANSACTION CHARACTERISTIC OPERATION 322, a party weighting value is determined for each relevant first party transaction characteristic. In one embodiment, a party weighting value for a given first party transaction characteristic is determined by dividing the relationship value associated with the given first party transaction characteristic by the combined relationship value determined at COMBINE THE DETERMINED RELATIONSHIP VALUES INTO A COMBINED RELATIONSHIP VALUE OPERATION 320.

Following the determination of each party weighting value at DETERMINE, USING THE COMBINED RELATIONSHIP VALUE, A PARTY WEIGHTING VALUE FOR EACH RELEVANT FIRST PARTY TRANSACTION CHARACTERISTIC OPERATION 322, the process proceeds with EXIT OPERATION 324 at which time the process ends awaiting new input.

In the discussion above, a normalizing value for each of the results characteristics was determined at DETERMINE A NORMALIZING VALUE FOR EACH OF THE RESULTS CHARACTERISTICS OPERATION 214. More detail as to operations performed in the determination of a normalizing value are presented below, in accordance with one embodiment.

In one embodiment, DETERMINE A NORMALIZING VALUE FOR EACH OF THE RESULTS CHARACTERISTICS OPERATION 214 for determining a normalizing value begins at ENTER OPERATION 402 and proceeds with DETERMINE POPULATION TRANSACTION CHARACTERISTICS OF TRANSACTIONS OF THE POPULATION TRANSACTION DATA OPERATION 404.

In one embodiment, at DETERMINE POPULATION TRANSACTION CHARACTERISTICS OF TRANSACTIONS OF THE POPULATION TRANSACTION DATA OPERATION 404, one or more population transaction characteristics of transactions of the population transaction data are determined through an analysis of the population transaction data.

As discussed above, in one embodiment, the population transaction characteristics include attributes or other details associated with the population transaction data. In one embodiment, transactions of the population transaction data are individual transactions of individual parties of the population, and thus include transactions accomplished by any party of the population performing any activity.

In one embodiment, one or more of the population transaction characteristics are directly associated with one or more population transactions of the population transaction data, such as, for example, a restaurant name being a payee listed in a financial transaction of a party of the population, the price of a meal purchased by the party of the population at the restaurant, one or more individual items that the meal included, their prices, and/or any other population transaction characteristics. In one embodiment, one or more of the population transaction characteristics are indirectly associated with or derived from one or more party transactions of the party transaction data. For example, in a party financial transaction listing a restaurant as a payee, where the address of the restaurant isn't data needed for the party financial transaction to be processed, the address of the restaurant is a party transaction characteristic derived from the payee name, and is determined, in one embodiment, using the payee name as a search parameter in one or more databases. Further, by using the address of the payee and a location of the party, one or more of a driving distance, driving time, a likely or actual route, and other population transaction characteristics are derived, for example, by determining a distance between a location of the party and a location of the payee, by assuming a typical driving speed based on collected data over the determined distance using a likely or actual route traveled, and through any other means of deriving additional data now known or later developed.

In one embodiment, once population transaction characteristics have been determined at DETERMINE POPULATION TRANSACTION CHARACTERISTICS OF TRANSACTIONS OF THE POPULATION TRANSACTION DATA OPERATION 404, process flow proceeds with ISOLATE POPULATION TRANSACTION CHARACTERISTICS THAT ARE EQUIVALENT TO RESPECTIVE RESULTS CHARACTERISTICS OPERATION 406.

In one embodiment, at ISOLATE POPULATION TRANSACTION CHARACTERISTICS THAT ARE EQUIVALENT TO RESPECTIVE RESULTS CHARACTERISTICS OPERATION 406, population transaction characteristics are compared with results characteristics, and population transaction characteristics that are equivalent to a results characteristic are set aside for further processing. In one embodiment, population transaction characteristics that are not equivalent to those of a results characteristic are not considered further.

In one embodiment, regardless of which kinds of transaction characteristics are results characteristics being considered, the particular transaction characteristics and the particular results characteristics are of a type and have a value. In one embodiment, using the example discussed above, a population transaction characteristic of a type "distance" has a value, such as two miles, four miles, 17 miles, or any other value that is appropriate for a particular population transaction having that particular population transaction characteristic. Finally, a results characteristic of the type "distance" also has a value associated with it, such as a value determined at the time the search is performed. For example, a restaurant search result having a results characteristic of the type "distance" may determine a value to be associated with that results characteristic by determining how far the restaurant is from a location of a party performing a search, such as a home location, a present location, or any other location associated with the party.

In one embodiment, the comparison may be made in several different ways. Further, in one embodiment, the comparison is made of the type of transaction characteristic or results characteristic, and is thus not made based on the value of the transaction characteristic or results characteristic.

In one embodiment, for example population transaction characteristics may be considered with results characteristics and only population transaction characteristics that are of the same type as at least one results characteristic are set aside for further processing.

In one embodiment, once population transaction characteristics have been isolated at ISOLATE POPULATION TRANSACTION CHARACTERISTICS THAT ARE EQUIVALENT TO RESPECTIVE RESULTS CHARACTERISTICS OPERATION 406, process flow proceeds with SELECT A POPULATION TRANSACTION CHARACTERISTIC FROM THE ISOLATED POPULATION TRANSACTION CHARACTERISTICS OPERATION 408.

In one embodiment, at SELECT A POPULATION TRANSACTION CHARACTERISTIC FROM THE ISOLATED POPULATION TRANSACTION CHARACTERISTICS OPERATION 408, at least two population transaction characteristics are within the population transaction characteristics isolated at ISOLATE POPULATION TRANSACTION CHARACTERISTICS THAT ARE EQUIVALENT TO RESPECTIVE RESULTS CHARACTERISTICS OPERATION 406.

If there is only one population transaction characteristic that is a member of the group of isolated population transaction characteristics that are equivalent to a results characteristic, in one embodiment, there is no need to determine a party weighting value and a normalizing value. In this limited case, the search results that have results characteristics that match a population transaction characteristic will be ordered at the top of any search result presentation to the originating computing system.

In one embodiment, at SELECT A POPULATION TRANSACTION CHARACTERISTIC FROM THE ISOLATED POPULATION TRANSACTION CHARACTERISTICS OPERATION 408, a population transaction characteristic is selected from the isolated population transaction characteristics. Remaining population transaction characteristics will be selected one at a time in turn.

In one embodiment, once a population transaction characteristic is selected from the isolated population transaction characteristics, at SELECT A POPULATION TRANSACTION CHARACTERISTIC FROM THE ISOLATED POPULATION TRANSACTION CHARACTERISTICS OPERATION 408, process flow proceeds with DETERMINE A POPULATION STANDARD DEVIATION OF VALUES REPRESENTED BY THE SELECTED POPULATION TRANSACTION CHARACTERISTIC OPERATION 410. The selected population transaction characteristic is associated with two or more population transactions, each of which have population transaction characteristic values associated with them. In one embodiment, at DETERMINE A POPULATION STANDARD DEVIATION OF VALUES REPRESENTED BY THE SELECTED POPULATION TRANSACTION CHARACTERISTIC OPERATION 410, a population standard deviation is determined using the various population transaction characteristic values associated with the equivalent population transaction characteristic. In one embodiment, the standard deviation of values is determined by taking the square root of the average of the squared differences of the values from their average value.

In one embodiment, once a population standard deviation of values is determined at DETERMINE A POPULATION STANDARD DEVIATION OF VALUES REPRESENTED BY THE SELECTED POPULATION TRANSACTION CHARACTERISTIC OPERATION 410, process flow proceeds with DETERMINE AN AVERAGE OF VALUES REPRESENTED BY THE POPULATION TRANSACTION CHARACTERISTIC OPERATION 412.

In one embodiment, at DETERMINE AN AVERAGE OF VALUES REPRESENTED BY THE POPULATION TRANSACTION CHARACTERISTIC OPERATION 412, the values represented by the population transaction characteristic are summed, and the total is divided by the number of values, resulting in an average of values represented by the population transaction characteristic.

In one embodiment, once an average of values has been determined at DETERMINE AN AVERAGE OF VALUES REPRESENTED BY THE POPULATION TRANSACTION CHARACTERISTIC OPERATION 412, process flow proceeds with DETERMINE UPPER AND LOWER LIMITS RELATING TO THE POPULATION STANDARD DEVIATION FOR THE SELECTED POPULATION TRANSACTION CHARACTERISTIC OPERATION 414.

In one embodiment, at DETERMINE UPPER AND LOWER LIMITS RELATING TO THE POPULATION STANDARD DEVIATION FOR THE SELECTED POPULATION TRANSACTION CHARACTERISTIC OPERATION 414, upper and lower limits are determined with respect to the population standard deviation previously determined at DETERMINE A POPULATION STANDARD DEVIATION OF VALUES REPRESENTED BY THE SELECTED POPULATION TRANSACTION CHARACTERISTIC OPERATION 410.

In one embodiment, the upper and lower limits are determined by using the values that are one standard deviation above and one standard deviation below the population standard deviation previously determined at DETERMINE A POPULATION STANDARD DEVIATION OF VALUES REPRESENTED BY THE SELECTED POPULATION TRANSACTION CHARACTERISTIC OPERATION 410. Alternatively, upper and lower limits may be determined by determining an upper value and a lower value that captures 80 percent of the values represented by the selected population transaction characteristic.

In one embodiment, once upper and lower limits are determined at DETERMINE UPPER AND LOWER LIMITS RELATING TO THE POPULATION STANDARD DEVIATION FOR THE SELECTED POPULATION TRANSACTION CHARACTERISTIC OPERATION 414, process flow proceeds with COMBINE THE UPPER AND LOWER LIMITS WITH THE ASSOCIATED RESULTS CHARACTERISTIC VALUE, RESULTING IN A NORMALIZING VALUE OPERATION 416.

In one embodiment, at COMBINE THE UPPER AND LOWER LIMITS WITH THE ASSOCIATED RESULTS CHARACTERISTIC VALUE, RESULTING IN A NORMALIZING VALUE OPERATION 416, the upper and lower limits determined at DETERMINE UPPER AND LOWER LIMITS RELATING TO THE POPULATION STANDARD DEVIATION FOR THE SELECTED POPULATION TRANSACTION CHARACTERISTIC OPERATION 414 are combined with the value of the selected population transaction characteristic, resulting in a normalizing value for the particular selected population transaction characteristic.

In one embodiment, a numerator is formed by subtracting the lower limit from the value of the selected population transaction characteristic. In one embodiment, a denominator is formed by subtracting the lower limit from the upper limit. In one embodiment, the normalizing value for the particular selected population transaction characteristic is formed by dividing the denominator into the numerator and multiplying the result by 100.

In one embodiment, once a normalizing value is determined for the particular selected population transaction characteristic at COMBINE THE UPPER AND LOWER LIMITS WITH THE ASSOCIATED RESULTS CHARACTERISTIC VALUE, RESULTING IN A NORMALIZING VALUE OPERATION 416, process flow proceeds with ARE THERE MORE POPULATION TRANSACTION CHARACTERISTICS TO ANALYZE? OPERATION 418.

In one embodiment, if, at ARE THERE MORE POPULATION TRANSACTION CHARACTERISTICS TO ANALYZE? OPERATION 418 there are more population transaction characteristics to analyze, process flow proceeds again with SELECT A POPULATION TRANSACTION CHARACTERISTIC FROM THE ISOLATED POPULATION TRANSACTION CHARACTERISTICS OPERATION 408 as previously outlined.

In one embodiment, if, at ARE THERE MORE POPULATION TRANSACTION CHARACTERISTICS TO ANALYZE? OPERATION 418 there are no more population transaction characteristics to analyze, process flow proceeds with EXIT OPERATION 420 and the process exits, awaiting new input.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above disclosure present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for customizing a user experience based on automatically weighted criteria comprising:
   at least one processor; and
   at least one memory coupled to the at least one processor, the at least one memory having stored therein instructions which when executed by the at least one processor, perform a process for customizing a user experience based on automatically weighted criteria comprising:
   receiving, from an originating computing system, a search request initiated by a first party, the search request including search criteria;
   determining two or more search request results meeting the search criteria, the two or more search request results each having results characteristics;
   receiving first party transaction data of the first party, the first party transaction data including individual first party transactions having first party transaction characteristics associated with the first party;
   receiving population transaction data for a population of users other than the first party, the population transaction data including individual population transactions having population transaction characteristics associated with users of the population;
   determining, using the first party transaction data, a party weighting value for each of the transaction characteristics of the first party transaction data that match at least one of the results characteristics;
   determining, using the population transaction data, a normalizing value for each of the population transaction characteristics of the population transaction data that match one of the results characteristics;
   combining, for each of the transaction characteristics of the first party transaction data that match one of the results characteristics, the respective normalizing value and party weighting value, resulting in a combined party rating;
   ordering the search results according to the combined party ratings; and
   presenting the search results to the originating computing system.

2. The system for customizing a user experience based on automatically weighted criteria of claim 1, wherein the party transaction data includes financial transaction data of the party received from at least one financial institution.

3. The system for customizing a user experience based on automatically weighted criteria of claim 1, wherein the population transaction data includes financial transaction data of individual members of the population received from at least one financial institution.

4. The system for customizing a user experience based on automatically weighted criteria of claim 1, wherein determining, using the party transaction data, a party weighting value for each of the transaction characteristics of the first party transaction data that match one of the results characteristics comprises:
   determining one or more first party transaction characteristics of one or more transactions of the first party transaction data;
   determining one or more population transaction characteristics of one or more transactions of the population transaction data;
   performing, for each first party transaction characteristic that is equivalent to a population transaction characteristic and which is also equivalent to a results characteristic:
   determining, over first party transactions having the first party transaction characteristic, a first party standard deviation of values represented by the first party transaction characteristic;
   determining, over population transactions having the population transaction characteristic, a population standard deviation of values represented by the population transaction characteristic; and
   determining a relationship value between the first party standard deviation and the population standard deviation;
   combining, once all relationship values have been determined, the relationship values into a combined relationship value; and
   determining a party weighting value for each first party transaction characteristic that is equivalent to a population transaction characteristic and which is also equivalent to a results characteristic by dividing each relationship value for each first party transaction characteristic by the combined relationship value.

5. The system for customizing a user experience based on automatically weighted criteria of claim 1, wherein determining, using the population transaction data, a normalizing value for each of the transaction characteristics of the first party transaction data that match one of the results characteristics comprises:
   determining one or more population transaction characteristics of one or more transactions of the population transaction data;
   performing, for each population transaction characteristic that is equivalent to a results characteristic:
   determining, over population transactions having the results characteristic, a population standard deviation of values represented by the population transaction characteristic;
   determining, using the values of each population transaction characteristic for each population transaction having the results characteristic, an average value of the population transaction characteristic;
   determining a first value which is one standard deviation below the average value of the population transaction characteristic;
   determining a second value which is one standard deviation above the average value of the population transaction characteristic; and
   determining, for each search result associated with the results characteristic, a normalized value for the results characteristic, the normalized value being determined using the first value, the second value and a results characteristic value associated with the search result.

6. The system for customizing a user experience based on automatically weighted criteria of claim 1, wherein the first party transaction characteristics include at least one first party transaction characteristic selected from the group of first party transaction characteristics consisting of:
- a distance;
- a food type;
- a merchant type;
- a product type; and
- a product cost.

7. The system for customizing a user experience based on automatically weighted criteria of claim 1, wherein the results characteristics include at least one results characteristic selected from the group of results characteristics consisting of:
- a distance;
- a food type;
- a merchant type;
- a product type; and
- a product cost.

8. The system for customizing a user experience based on automatically weighted criteria of claim 1, wherein at least one result characteristic is derived from a combination of party data and entity data, wherein entity data is data about an entity associated with an individual search result.

9. The system for customizing a user experience based on automatically weighted criteria of claim 8, wherein distance is a result characteristic derived from a location of the entity and a location of the party.

10. A system for customizing a user experience based on automatically weighted criteria comprising:
- receiving, at a second computing system from an originating computing system, a search request initiated by a first party, the search request including search criteria;
- determining, at the second computing system, two or more search request results meeting the search criteria, the two or more search request results each having results characteristics;
- receiving, at a third computing system, data indicating the results characteristics;
- receiving, at the third computing system, first party transaction data of the first party, the first party transaction data including individual first party transactions having first party transaction characteristics associated with the first party;
- receiving, at the third computing system, population transaction data for a population of users other than the first party, the population transaction data including individual population transactions having population transaction characteristics associated with users of the population;
- determining, at the third computing system using the first party transaction data, a party weighting value for each of the transaction characteristics of the first party transaction data that match at least one of the results characteristics;
- determining, at the third computing system using the population transaction data, a normalizing value for each of the transaction characteristics of the first party transaction data that match one of the results characteristics;
- combining, at the third computing system for each of the transaction characteristics of the first party transaction data that match one of the results characteristics, the respective normalizing value and party weighting value, resulting in a combined party rating;
- receiving, at the second computing system, the combined party ratings;
- ordering, at the second computing system, the search results according to the combined party ratings; and
- presenting the search results to the originating computing system.

11. The system for customizing a user experience based on automatically weighted criteria of claim 10, wherein the party transaction data includes financial transaction data of the party received from at least one financial institution.

12. The system for customizing a user experience based on automatically weighted criteria of claim 10, wherein the population transaction data includes financial transaction data of individual members of the population received from at least one financial institution.

13. The system for customizing a user experience based on automatically weighted criteria of claim 10, wherein determining, at the third computing system using the party transaction data, a party weighting value for each of the transaction characteristics of the first party transaction data that match one of the results characteristics comprises:
- determining one or more first party transaction characteristics of one or more transactions of the first party transaction data;
- determining one or more population transaction characteristics of one or more transactions of the population transaction data;
- performing, for each first party transaction characteristic that is equivalent to a population transaction characteristic and which is also equivalent to a results characteristic:
  - determining, over first party transactions having the first party transaction characteristic, a first party standard deviation of values represented by the first party transaction characteristic;
  - determining, over population transactions having the population transaction characteristic, a population standard deviation of values represented by the population transaction characteristic; and
  - determining a relationship value between the first party standard deviation and the population standard deviation;
- combining, once each relationship value has been determined, the relationship values into a combined relationship value; and
- determining a party weighting value for each first party transaction characteristic that is equivalent to a population transaction characteristic and which is also equivalent to a results characteristic by dividing each relationship value for each first party transaction characteristic by the combined relationship value.

14. The system for customizing a user experience based on automatically weighted criteria of claim 10, wherein determining, at the third computing system using the population transaction data, a normalizing value for each of the transaction characteristics of the first party transaction data that match one of the results characteristics comprises:
- determining one or more population transaction characteristics of one or more transactions of the population transaction data;
- performing, for each population transaction characteristic that is equivalent to a results characteristic:
  - determining, over population transactions having the results characteristic, a population standard deviation of values represented by the population transaction characteristic;
  - determining, using the values of each population transaction characteristic for each population transaction having the results characteristic, an average value of the population transaction characteristic;

determining a first value which is one standard deviation below the average value of the population transaction characteristic;

determining a second value which is one standard deviation above the average value of the population transaction characteristic; and determining, for each search result associated with the results characteristic, a normalized value for the results characteristic, the normalized value being determined using the first value, the second value and a results characteristic value associated with the search result.

15. The system for customizing a user experience based on automatically weighted criteria of claim 10, wherein the first party transaction characteristics include at least one first party transaction characteristic selected from the group of first party transaction characteristics consisting of:
a distance;
a food type;
a merchant type;
a product type; and
a product cost.

16. The system for customizing a user experience based on automatically weighted criteria of claim 10, wherein the results characteristics include at least one results characteristic selected from the group of results characteristics consisting of:
a distance;
a food type;
a merchant type;
a product type; and
a product cost.

17. The system for customizing a user experience based on automatically weighted criteria of claim 10, wherein at least one result characteristic is derived from a combination of party data and entity data, wherein entity data is data about an entity associated with an individual search result.

18. The system for customizing a user experience based on automatically weighted criteria of claim 17, wherein distance is a result characteristic derived from a location of the entity and a location of the party.

19. A computer program product for customizing a user experience based on automatically weighted criteria comprising:
a nontransitory computer readable medium, and
executable program code which when loaded into memories of one or more computing systems and executed by one or more computing system processors coupled to the memories performs a process for customizing a user experience based on automatically weighted criteria comprising:
receiving a search request initiated by a first party, the search request including search criteria;
determining two or more search request results meeting the search criteria, the two or more search request results each having results characteristics;
receiving data indicating the results characteristics;
receiving first party transaction data of the first party, the first party transaction data including individual first party transactions having first party transaction characteristics associated with the first party;
receiving population transaction data for a population of users other than the first party, the population transaction data including individual population transactions having population transaction characteristics associated with users of the population;
determining, using the first party transaction data, a party weighting value for each of the transaction characteristics of the first party transaction data that match at least one of the results characteristics;
determining, using the population transaction data, a normalizing value for each of the transaction characteristics of the first party transaction data that match one of the results characteristics;
combining, for each of the transaction characteristics of the first party transaction data that match one of the results characteristics, the respective normalizing value and party weighting value, resulting in a combined party rating;
ordering the search results according to the combined party ratings; and
presenting the search results to the originating computing system.

20. The computer program product for customizing a user experience based on automatically weighted criteria of claim 19, wherein the party transaction data includes financial transaction data of the party received from at least one financial institution.

21. The computer program product for customizing a user experience based on automatically weighted criteria of claim 19, wherein the population transaction data includes financial transaction data of individual members of the population received from at least one financial institution.

22. The computer program product for customizing a user experience based on automatically weighted criteria of claim 19, wherein determining, at the third computing system using the party transaction data, a party weighting value for each of the transaction characteristics of the first party transaction data that match one of the results characteristics comprises:
determining one or more first party transaction characteristics of one or more transactions of the first party transaction data;
determining one or more population transaction characteristics of one or more transactions of the population transaction data;
performing, for each first party transaction characteristic that is equivalent to a population transaction characteristic and which is also equivalent to a results characteristic:
determining, over first party transactions having the first party transaction characteristic, a first party standard deviation of values represented by the first party transaction characteristic;
determining, over population transactions having the population transaction characteristic, a population standard deviation of values represented by the population transaction characteristic; and
determining a relationship value between the first party standard deviation and the population standard deviation;
combining, once each relationship value has been determined, the relationship values into a combined relationship value; and
determining a party weighting value for each first party transaction characteristic that is equivalent to a population transaction characteristic and which is also equivalent to a results characteristic by dividing each relationship value for each first party transaction characteristic by the combined relationship value.

23. The computer program product for customizing a user experience based on automatically weighted criteria of claim 19, wherein determining, at the third computing system using the population transaction data, a normalizing value for each of the transaction characteristics of the first party transaction data that match one of the results characteristics comprises:
- determining one or more population transaction characteristics of one or more transactions of the population transaction data;
- performing, for each population transaction characteristic that is equivalent to a results characteristic:
- determining, over population transactions having the results characteristic, a population standard deviation of values represented by the population transaction characteristic;
- determining, using the values of each population transaction characteristic for each population transaction having the results characteristic, an average value of the population transaction characteristic;
- determining a first value which is one standard deviation below the average value of the population transaction characteristic;
- determining a second value which is one standard deviation above the average value of the population transaction characteristic; and
- determining, for each search result associated with the results characteristic, a normalized value for the results characteristic, the normalized value being determined using the first value, the second value and a results characteristic value associated with the search result.

24. The computer program product for customizing a user experience based on automatically weighted criteria of claim 19, wherein the first party transaction characteristics include at least one first party transaction characteristic selected from the group of first party transaction characteristics consisting of:
- a distance;
- a food type;
- a merchant type;
- a product type; and
- a product cost.

25. The computer program product for customizing a user experience based on automatically weighted criteria of claim 19, wherein the results characteristics include at least one results characteristic selected from the group of results characteristics consisting of:
- a distance;
- a food type;
- a merchant type;
- a product type; and
- a product cost.

26. The computer program product for customizing a user experience based on automatically weighted criteria of claim 19, wherein at least one result characteristic is derived from a combination of party data and entity data, wherein entity data is data about an entity associated with an individual search result.

27. The computer program product for customizing a user experience based on automatically weighted criteria of claim 26, wherein distance is a result characteristic derived from a location of the entity and a location of the party.

* * * * *